United States Patent [19]

Pryor

[11] Patent Number: 5,910,894
[45] Date of Patent: Jun. 8, 1999

[54] SENSOR BASED ASSEMBLY TOOLING IMPROVEMENTS

[75] Inventor: Timothy R. Pryor, Windsor, Canada

[73] Assignee: Sensor Adaptive Machines, Inc., Windsor, Canada

[21] Appl. No.: 08/481,479

[22] PCT Filed: Jan. 11, 1994

[86] PCT No.: PCT/US94/00398

§ 371 Date: Sep. 25, 1995

§ 102(e) Date: Sep. 25, 1995

[87] PCT Pub. No.: WO94/16401

PCT Pub. Date: Jul. 21, 1994

Related U.S. Application Data

[63] Continuation-in-part of application No. 08/002,384, filed as application No. PCT/CA92/00296, Jan. 11, 1992, abandoned.

[51] Int. Cl.[6] ........................................ G06F 19/00
[52] U.S. Cl. .......................... 364/468.01; 364/468.21; 29/712; 219/121.64
[58] Field of Search .................... 364/468, 513, 364/468.01, 468.21; 29/712, 407, 430; 403/57; 219/121.64

[56] References Cited

U.S. PATENT DOCUMENTS

| | | | |
|---|---|---|---|
| 4,321,679 | 3/1982 | Fujie et al. | 364/474.34 |
| 4,796,200 | 1/1989 | Pryor | 364/513 |
| 4,954,005 | 9/1990 | Knasel et al. | 403/57 |
| 5,005,277 | 4/1991 | Uemura et al. | 29/407 |
| 5,010,634 | 4/1991 | Uemura et al. | 29/407 |
| 5,155,690 | 10/1992 | Nomaru et al. | 364/468.21 |
| 5,168,453 | 12/1992 | Nomaru et al. | 364/468 |
| 5,211,061 | 5/1993 | Goodwin | 73/862.541 |
| 5,239,739 | 8/1993 | Akeel et al. | 29/430 |
| 5,272,805 | 12/1993 | Akeel et al. | 29/712 |
| 5,380,978 | 1/1995 | Pryor | 219/121.64 |

OTHER PUBLICATIONS

Proceedings of the International Conference on Industrial Electronics Control and Instrumentation, Kobe, Oct. 28–Nov. 1, 1991, vol. 2 of 3, Institute of Electrical and Electronics Engineers, pp. 878–883, Esteban et al.

*Primary Examiner*—William Grant
*Assistant Examiner*—Sheela S. Rao
*Attorney, Agent, or Firm*—Larson & Taylor

[57] ABSTRACT

A method and apparatus for assembly particularly addressed to the assembly of automobiles and aircraft done with reconfigurable modular and "intelligent" tooling fixtures (also called jigs, or holding fixtures). Much of the capability of the system is brought by the optical or other non-contact sensing devices incorporated with the tools to provide information on part location, tooling detail location, and automation (such as robots), used to load, weld, rivet, or otherwise perform work with parts in the tool. A preferred version of the invention uses 3-dimensional stereo and/or other simpler electro-optical ranging and feature location sensors operating in real time to perform numerous measurements of location of critical features of assembly tools and the parts placed within them, to even include detection of abnormal features such as missing holes or welds. The computer system associated with the sensors builds up a data base of part condition before, during and after welding (or other working or assembly function within the tool). This data base is used automatically, or by an engineer or operator, to continuously improve the process and to feed data to related processes.

39 Claims, 13 Drawing Sheets

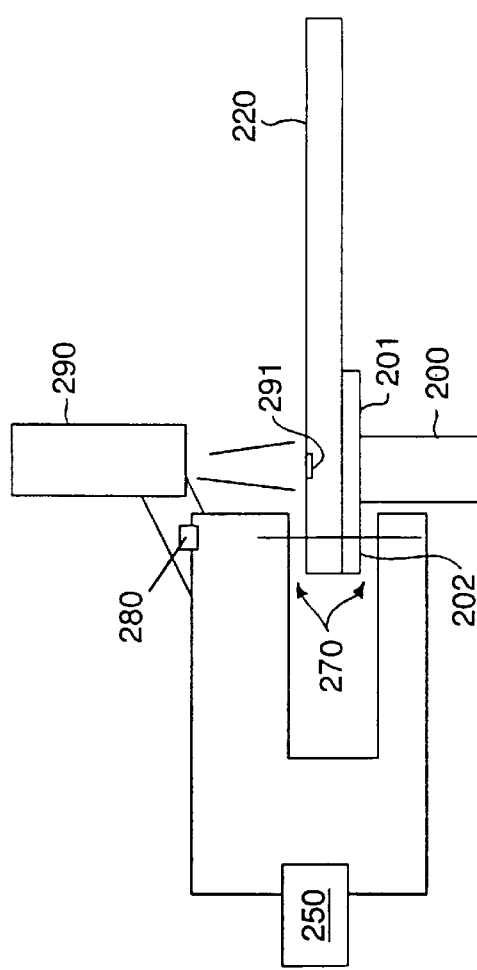
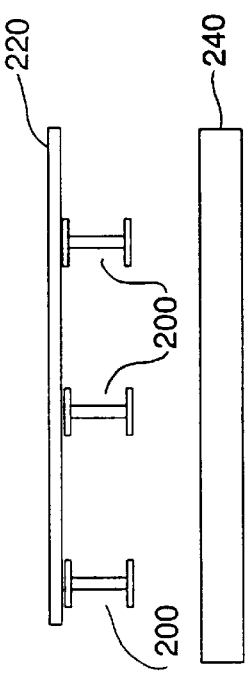
FIG. 11b
FIG. 11a
FIG. 11c

SENSOR BASED ASSEMBLY TOOLING IMPROVEMENTS

This application is a National Stage Filing of PCT/US94/00398 and is a continuation-in-part of U.S. application Ser. No. 08/002,384 filed Jan. 11, 1993, now abandoned, which was a National Stage Filing of PCT/CA92/00296 filed Jan. 11, 1992.

This application also continues ideas from several of my pending applications and of my patents, which applications and patents are also incorporated by reference. These are:
1. Method and Apparatus for Assembly of Car Bodies and Other 3-Dimensional Objects, PCT Appln. SN PCT/CA92/00296, filed Jan. 11, 1992.
2. Method and Apparatus for Assembly, U.S. Ser. No. 07/728,682, filed Jul. 12, 1992, now U.S. Pat. No. 5,380,978.
3. Robot Vision Using Targets, U.S. Ser. No. 07/664,574, filed Mar. 6, 1991, now U.S. Pat. No. 5,506,682 and U.S. Pat. No. 4,654,949.
4. Target Based Determination of Robot and Sensor Alignment, U.S. Ser. No. 07/733,035, filed Jul. 22, 1991, now abandoned, and U.S. Pat. No. 4,796,200).
5. Vision Assisted Fixture Construction, U.S. Ser. No. 07/866,653, filed Apr. 8, 1992, now U.S. Pat. No. 5,267,143.
6. Robot Vision using Holes, Corners, etc., U.S. Ser. No. 07/697,345, filed May 9, 1991, now abandoned.
7. Controlled Machining, U.S. Ser. No. 07/848,937, filed Mar. 10, 1992, now abandoned.
8. Apparatus for Determining Dimensions, U.S. Ser. No. 07/770,728, filed Oct. 4, 1991, now abandoned.
9. Turbine, U.S. Pat. No. 4,373,804.
10. Cams, U.S. Pat. Nos. 4,576,482 and 5,114,230.

BACKGROUND OF THE INVENTION

The above referenced applications have dealt in the main with the mechanisms for vision controlled positioning and checking of the parts to be assembled, with automotive sheet metal components being the particular area most disclosed. This application goes into more detail on the intelligence functions that can be brought to bear on serial production of components, as well as singular components. It also describes in more detail the standard modules of the system, and the standard assembly systems that result, including an extension to aircraft assembly operations, and particularly the riveting operations for attachment of the airplane's "skin".

As pointed out in my previous applications, the overall goal of the invention is to provide a far higher degree of flexibility for factories—even as here disclosed allowing them to become "dual use" factories (that is for example capable of making aircraft in time of war, but using substantially the same tool and its sensing control systems for making sheet metal car bodies during peace).

This invention further elaborates on the concept first described in the reference co-pending application (ref. 7), which discloses the advantages of rapidly and electro-optically obtaining substantial amounts of accurate data concerning the parts produced, and providing the data base so created to other process steps within the overall process of manufacture.

There is a need in the industry to assure that the pieces to be welded together to make a sheet metal car body assembly and other similar assemblies and other industries, such as white goods, tractors, trucks, etc. contain the correct features and overall shapes, that they are in sufficient position to be welded, that they have been clamped together correctly for welding or other joining purposes, and that they are in the correct configuration and shape for welding. In addition, the robots or other welding automation used to make the welds also need to be confirmed in their location if possible before executing their tasks or sensor-wise caused to go to the correct location. In today's lines with fixed hard tools locating the parts in fixed clamps coming down, with either manual load of the panels, or automatic load, and robotic and fixed guns located programmably moving to different locations or the use of fixed guns within the tool to tack down the parts, there is very little sensory processing within the tool. The only thing in common use, to my knowledge, is limit switches, which essentially assure that the clamps have gone down, and in some cases that the parts are more or less in place. These switches are typically inductive types proximity switches or mechanical contact switches.

For the assurance that the assembly has been correct after welding, parts have been put on manual checking fixtures after welding, checked by CMM, or in some elaborate installation, checked by in-line optical gaging systems such as those built by Diffracto and Perceptron in the U.S.

This application is aimed at increasing the sensory capabilities of the tooling and related assembly systems, and follows form several previous applications by the inventor referenced above. Electro-optical sensors are preferably used for the measurement of tool and part position, as well as force sensors in certain embodiments for the determination of forces rendered by the clamping or welding devices. In this application, two other forms of sensors are depicted; namely the use of a 3D range imaging sensor device, and a use of miniature TV and/or stereo, or light section triangulation sensors located on the tool base. These are in place of, or addition to, the photogrammetric sensors.

The cost of design and construction and the time involved therefore for the fixture tools needed to assemble the structure and other parts of cars, aircraft, or other three dimensional objects constitute huge cost burdens to the launching of any new product in these areas. "Tooling" (also including form tools such as dies and molds) for a new car can cost several hundred million dollars, for just the physical design and build of the "hard" tools, not including any robots or other automation, nor the labor of using the tools, or of trying to adjust them after the fact. The situation in the car business is of late compounded by shorter product life cycles and the necessity to make old parts for a longer period of time, even after the plant itself has changed over to some new model.

Using today's technology, no more than 10% of the assembly tooling used for the previous model is reusable. By going to modular and standardized components of the invention, coupled with their intelligent control, it is estimated that nearly 90–95% may become usable. This has huge capital life cycle cost implications, on top of which is the huge improvement in quality and production efficiency offered by the invention, which can check its own work as desired to assure all conditions are correct and develop data bases from which subsequent tools can be developed, and to generate intelligence of the process which can be used to decrease down time and reduce scrap, and improve production efficiency at all levels of the enterprise.

There is a need in the industry to assure that the pieces to be welded together to make a sheet metal car body assembly and other similar assemblies and to make sheet metal assemblies in other industries, such as white goods, tractors, trucks, etc. contain the correct features and overall shapes, that they are in sufficient position to be welded, that they have been clamped together correctly for welding or other joining purposes, and that they are in the correct configuration and shape after welding. In addition, the robots or other welding automation used to make the welds also need to be confirmed in their location if possible before executing their tasks or their positions sensed and then so controlled so as to go to the correct location.

In today's lines with fixed hard tools locating the parts in fixed clamps with either manual load of the panels, or automatic load, and robotic and fixed guns located programmably moving to different locations or the use of fixed guns within the tool to tack down the parts, there is very little sensor processing within the tool. The only thing in common use, to my knowledge, is limit switches, which essentially assure that the clamps have gone down, and in some cases that the parts are more or less in place. These switches are typically inductive types—proximity switches or mechanical contract switches.

For the assurance that the assembly has been correct after welding, parts have been put on manual checking fixtures after welding, checked by CMM, or in some elaborate installation, checked by in-line optical gaging systems, such as those built by Diffracto and Perceptron in the U.S.

This application is aimed at increasing the sensory and reconfigurability capabilities of the tooling, and follows from several previous applications by the inventor referenced above.

Much of the prior art, so to speak, is my own, and referenced above. Some of these cases have been granted or published in some form.

Additional prior art in, directly applicable to these particular areas, are the group of patents filed by Nissan Motor Car Co. of Japan. Those I am aware of are U.S. Pat. Nos. 5,005,277; 5,010,634, 4,691,905; and 4,880,307; U.K. #2,234,606 A, as well as various Nissan press releases, etc., on their "Intelligent Body Assembly System", (IBAS).

Another reference, filed by McGee et al. (GMF Robotics Corp), U.S. Pat. No. 4,942,539 or PCT/US89/05727 is directed primarily at the use of determination of 3D orientation of objects from vision data, particularly for the assembly of completed major car sub-assemblies.

Other prior art references in the general field of car body assembly are:
1. Sciaky, U.S. Pat. No. 4,654,505.
2. Alborante (Comau), U.S. Pat. No. 5,115,115 and 5,064,991.
3. European Patent 87100612.8 or EP 0261 297, by Kurt Jack.
4. Inoue et al. (Toyota) U.S. Pat. No. 4,779,336.

It is an overall goal of the invention to allow much more rapid response to market demands by allowing accurate tools to be built of modular components that could be rapidly assembled and verified, using the sensing systems of the invention, and as well tools that can be increasingly "smart", or "intelligent", allowing a variety of different functions to be accomplished, allowing the operation to much more rapidly home in on the idealized settings for various locator positions, clamps, and other devices that are used within tools to assure the maximum possible quality and productivity, using the parts that are being provided to the tools, which may themselves be less than perfect, and require accommodation at the tool.

It is also an overall goal of the invention to provide means for gathering and generating data bases using sensing systems, which will allow the feed forward of data taken in the tool to further welding, or other assembly operations, and to feed back the data to previous assembly or welding operations, or even to press plants and other functions.

It is a further goal of the invention to provide a means to develop the process in the most optimum manner, such that the further work with the same or similar tools on related parts, can be more optimally designed through use of the data base generated, and its feedback to the CAD design system of both the parts and the tools. By providing the mechanism for assurance of quality within the tool, the various combinations and perturbations of the initial tool location and clamping, welding and other settings can be made, while still assuring that acceptable parts leave the tool. This then allows an automated development of the tooling process, and serves to provide data for subsequent processes with the same tool, similar tools, similar parts, or with other similar processes.

It is also a goal of the invention to disclose communication of data from the sensor system of the invention at a particular tool location to other parts of the immediate work assembly system, such as other tooling stages in a body side line, as well as to other feeder plants, or post-assembly operations that could use the dimensional and other weld data obtained, and to further communicate to other portions of the enterprise the data for the incorporation into the design systems, and for use in the maintenance of both the instant tool of the invention, as well as in those processes ahead of it that could be causing the problems that are detected in the tool.

It is also purpose of this invention, where possible, to provide systems to assist in the reduction of the flange width required for welding. This can effect a major weight and cost saving in vehicle manufacture.

It is also a goal of the invention to provide systems which can produce acceptable assemblies with marginal or defective incoming constituents parts, by optimizing their interrelationship to produce where possible an acceptable (and at the very least, flag the assembly as defective and reject it if such optimization is not possible). The invention herein further addresses the learning from sequential runs of parts through the tool. This is particularly aimed at the building up of the data base, as mentioned, and the perturbation of various parameters. The goal is reduction of variability of the parts, and optimizing the assembly for a given group of constituent parts.

It is also a goal of the invention to provide data to assist in design of the next set of tools, for example aiding in the proper choice of clamping locations based on studies of perturbations in location of those locations used.

It is a further goal to provide, using vision systems and other sensor devices as appropriate, checks within the tool cell for missing holes in parts, incomplete metal, misloaded parts that may not be seated correctly in the tool, and for sensing the quality of welds optically to the level that this possible. (Also described in reference 1.) In some cases, these functions can be performed by the same 3D camera or other sensor system that determines the location of the parts and the tooling locators.

It is also a goal of the invention to provide for the modification of the part in the tool, as a result of sensed data. One version of this includes the laser based bending of the part, due to internal stresses. Another includes laser cutting of holes, slots, tabs, edge trimming and other activities. Drilling and riveting is also contemplated, as are additional machining or assembly operations within the tool.

These and other goals of the invention are achieved as described in the description which follows.

DESCRIPTION OF PREFERRED EMBODIMENTS

FIG. 11a is a front view of a fixture and FIG. 11b is an enlarged side view of the portion of FIG. 11a identified with 11b, and FIG. 11c is a schematic front view of the series of sections in FIG. 11a which have been omitted for clarity. Together, these figures illustrate a similar fixture to that of FIG. 1, but this time for aircraft riveting, where once again the locations of the clamps, parts, the holes to be drilled by the programmable robot system, as well as the riveting tools of the robot system, may all monitored optically and cross compared to assure correct quality and maximum dynamic speed of the system under control.

Figure 12:
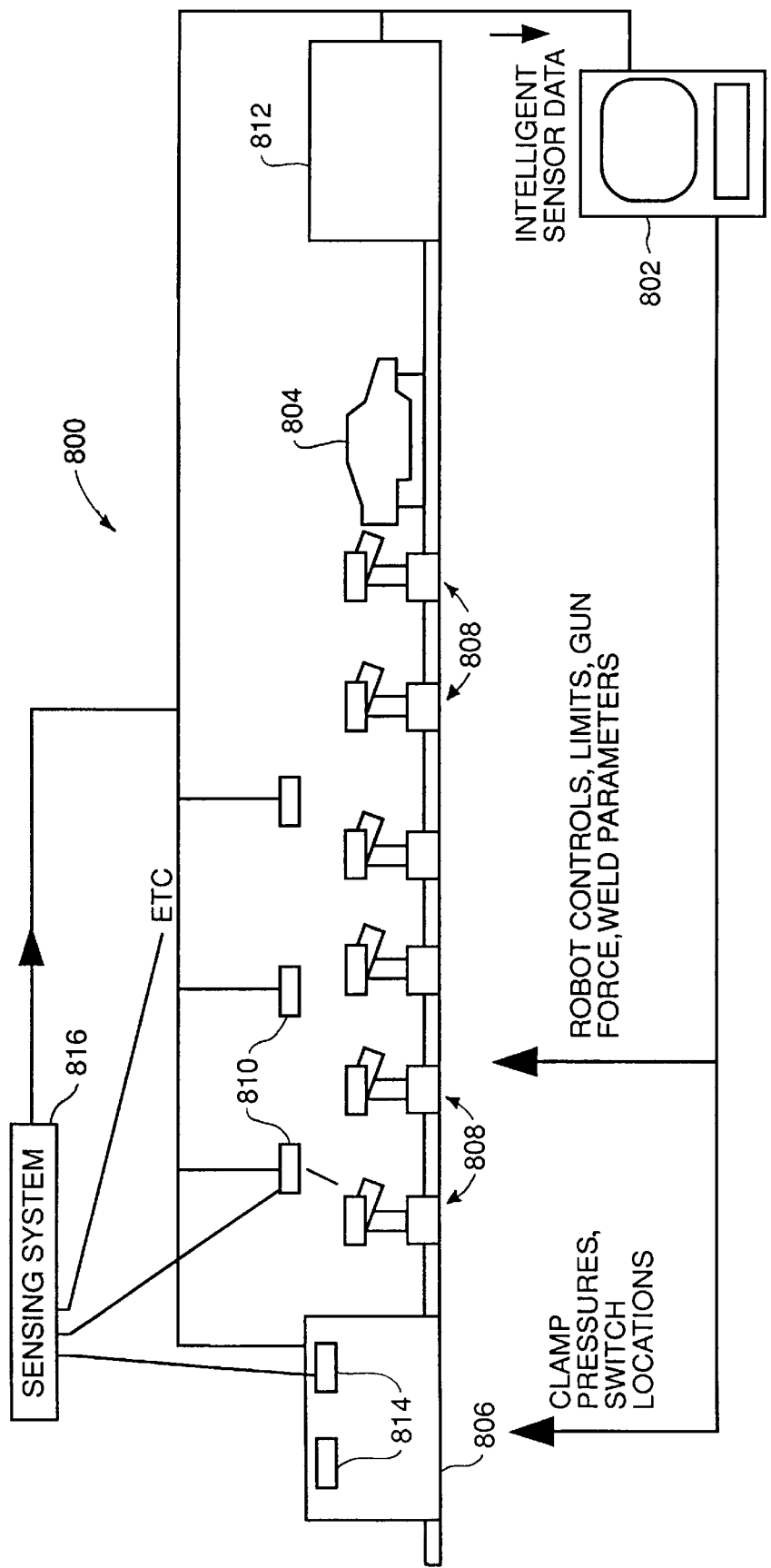

FIG. 12 shows a line including tools, robot welders and in-line vision gages or CMMs. Such a control system can allow maximum up time, highest accuracy of body build and decreased flange widths. Optional are force and weld parameter monitoring.

Figure 13:
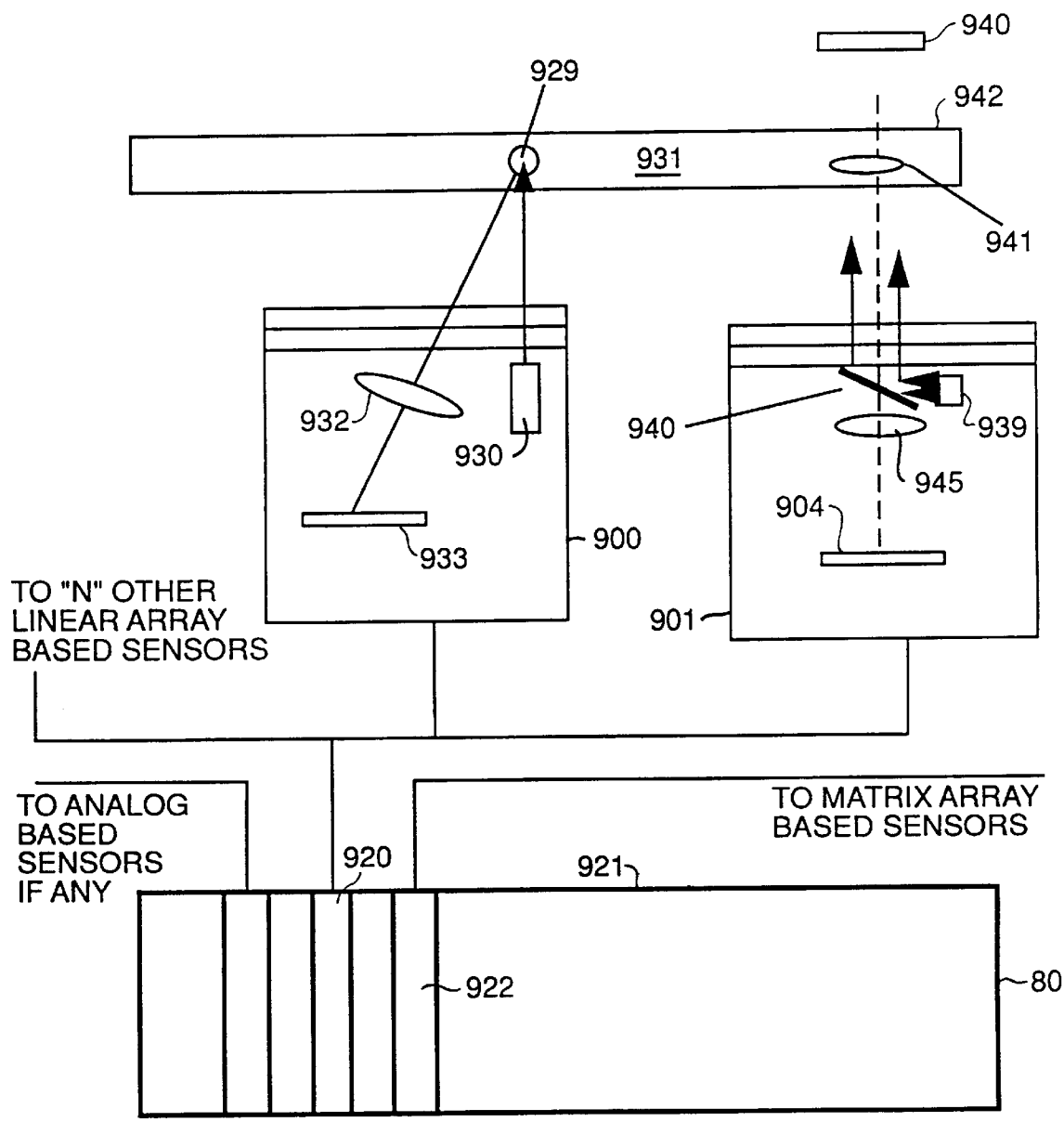

FIG. 13 illustrates further in-tool sensors of the invention.

FIG. 1

Figure 1:
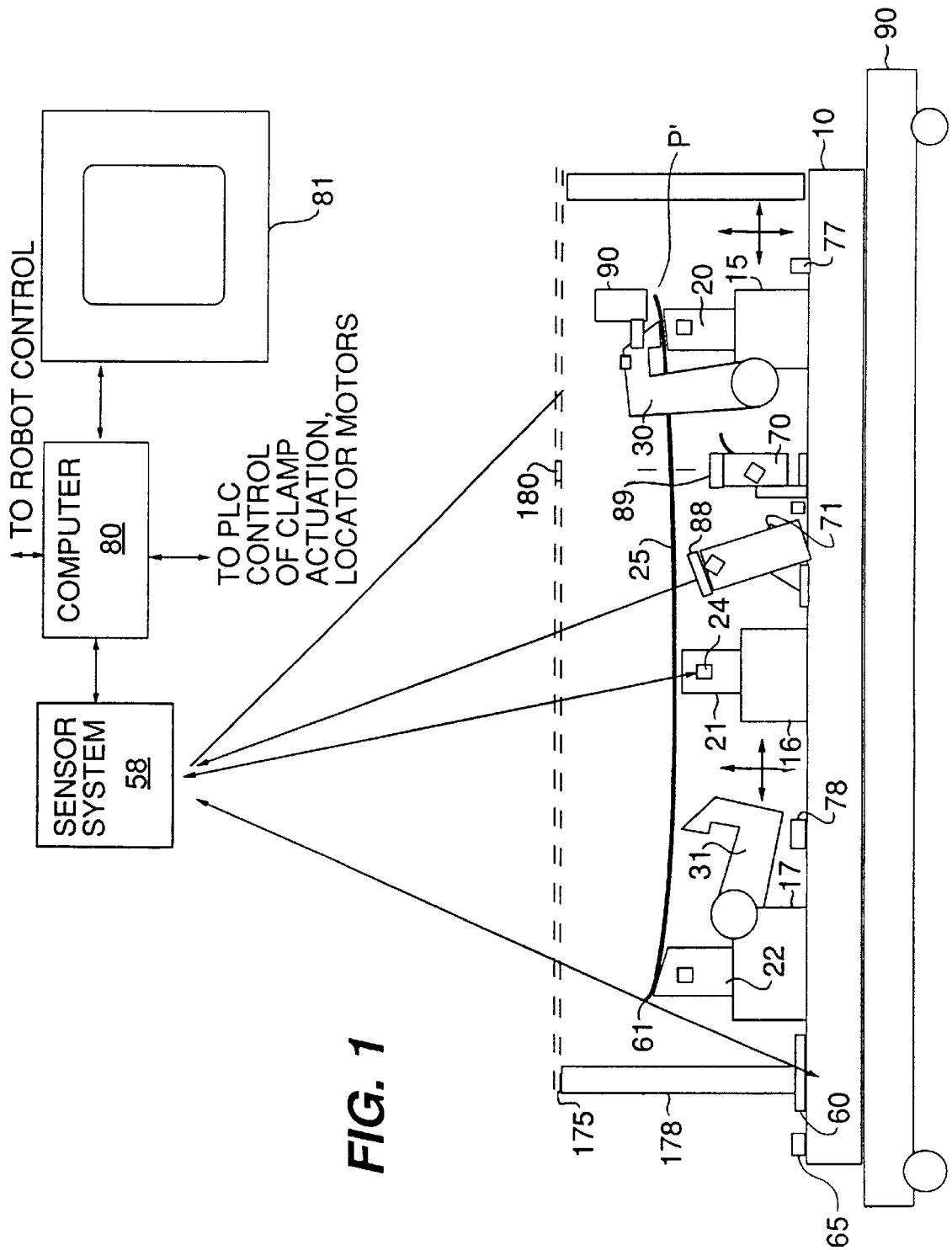
FIG. 1 illustrates a side body weld fixture and assembly cell according to the invention. For sake of clarity, only one section of the cell is illustrated of the many sections required for this large part comprised of multiple sub-assemblies.

FIG. 1 shows a basic tool, according to the invention, used to locate and weld parts of a car body side or door. The tool is built of generic components, such as the repositionable locator mounts (also called risers) 15, 16 and 17, and NC machined sheet metal part locating blocks 20, 21 and 22, which using means to be described can be moved either manually or automatically in, at least, 3 axes; x, y, z of the plane of the drawing. The mounts are positioned to suit the panel assembly in question on base 10, and the first part 25 is shown, having been laid in place against rough stops not shown. One clamp 30, has been actuated to force one end of the part 25 down on locating block 20 (whose surface conforms to fit the part, either by manufacture, or in a variable manner) while the other clamp 31 remains to be energized when the second part 26 (shown in FIG. 2) is placed on part 25 welding the two together.

It should be noted that clamps 30 and 31 are of the swing-in type, (so as to clear panel load/unload) and for clarity of other details to be illustrated, have been shown not necessarily in their correct position. They normally would be 180 degrees (rotating in from outside), or 90 degrees (out of plane of drawing) from the locations shown.

An optical measuring system 58 is located overhead in this case where the parts are laid down. If the parts were in vertical, or "car position" the sensor unit would be off to the side with the tool base 10 vertical. The large field sensor unit 58 could be a stereo photogrammetric sensor system, using TV cameras, such as that described in the above referenced applications (and further in FIG. 5 below), or any other suitable sensor system to do the tasks here described. For example, a real time 3D imaging device, of the laser scanning type, using triangulation (the Canadian National Research Council System, marketed as a Hyscan system), or a laser doppler radar device, such as the LASAR system marketed by Perceptron of Farmington Hills, Mich. However, in my experience the TV camera based systems have advantages for this, in terms of faster speed, less processing requirements and an ability to do more of the tasks at hand to the accuracy levels required than the 3D laser scanning devices. However, any suitable sensor system that can achieve the accuracies desired can be used.

In some cases a combination of sensors may be required to achieve the job at hand at the accuracies required. Generally speaking, non contact sensor means are preferably employed, as they to not cause crashes or part/sensor wear. In addition, when measuring parts, distortion can occur if contact pressure is too high. This is a particular problem with sheet metal.

With the part 25 initially not present, the sensor system is used to guide an operator or control automation (not shown) to position the locator blocks (20–22) in the correct positions, along with other locator blocks out of the plane of the drawing to accommodate the parts which are not shown (since only a section of part 25, a body side, is shown). The movement of these location surfaces has been described in the referenced previous applications. A sensor system is positioned before and where possible and not occluded during operation with the parts to check the position of the locators, and any other sensory, or clamping, or robotic devices used. In this case, specialized datum targets such as a retroreflector, for example comprised of either glass or retroreflective tape with suitable protective elements on it, is shown located on all critical points, such as the clamps, locators and effectors, etc., as well as referenced to the base itself. This allows the camera system to determine the relationships between all of these points, and for many purposes:

1. To assure that the camera system is correctly positioned relative to the reference frame of the base, using targets 65, 77, and 78, which are representative. The target datums are located around the periphery and where possible also inside the periphery of the tool base for reference. These are on known spatial locations on the base, and the individual components such as locator 21, for example can be referenced directly to its most local point, such as target 24 by the camera system, if desired.
2. To assure the correct position of the locating surfaces of blocks 20, 21, and 22 and to help assist an operator if the system is not automatic to do so via display of the data on display screen 81, connected to the computer processor 80. This then guides the motors, if used, positioning the NC blocks, or the manually positioning, if done, into the correct position for this part. This for example, is typical that a tool of this type could be used with relatively small movements of the locator to build numerous types of body sides or doors, with relatively small (±10 cm in any direction) moves of the locator blocks (and sometimes smaller than that).

The sensor system also is used to sense the clamps to assure that they have gone into their proper position, and acts as an alternative or back up to any sort of part presence of limit switches, such as those used conventionally for that purpose. The sensor system also observes the part itself to make sure it is in the correct location, before the next part is added (ideally), and to provide any offset data to the positioning of the next part if required. It also is used to check the part 25 to determine that all holes are correctly present, and that the metal is sufficient and not deformed, so as to preclude the welding operation to follow. Sensing can be done on the edge 61 of the part, conveniently, by using retroreflective tape 60, located either on a point, or all the way along under an edge if viewable, and it can be done in reflection, using light projection from above, as has been shown in previous applications. Note that such scotchlite tape can be placed under holes to accentuate them, and even recessed on the locating surfaces of the locating blocks if desired.

It should be noted that the fixture of FIG. 1 can be mounted in a stationary position on the floor, or alternatively moved from station to station in a line (for example on an AGV mounted pallet, such as pallet 90) to allow different operations to be performed at different locations within a factory. In this case reference datum such as 65, can be desirably used to allow a sensor system at the station in question to be aligned with the fixture transported into the station. This sensor can be used to correct robotic or other operations in loading parts into the tool or joining parts in the tool. In addition, one can reconfigure the tool at an off-line location, and feed it into the line when ready. If such reconfiguration is rapid enough to keep up with line demands, this can create continuously circulating pallets of reconfigurable tools providing a system of great flexibility.

FIG. 2

Figure 2:
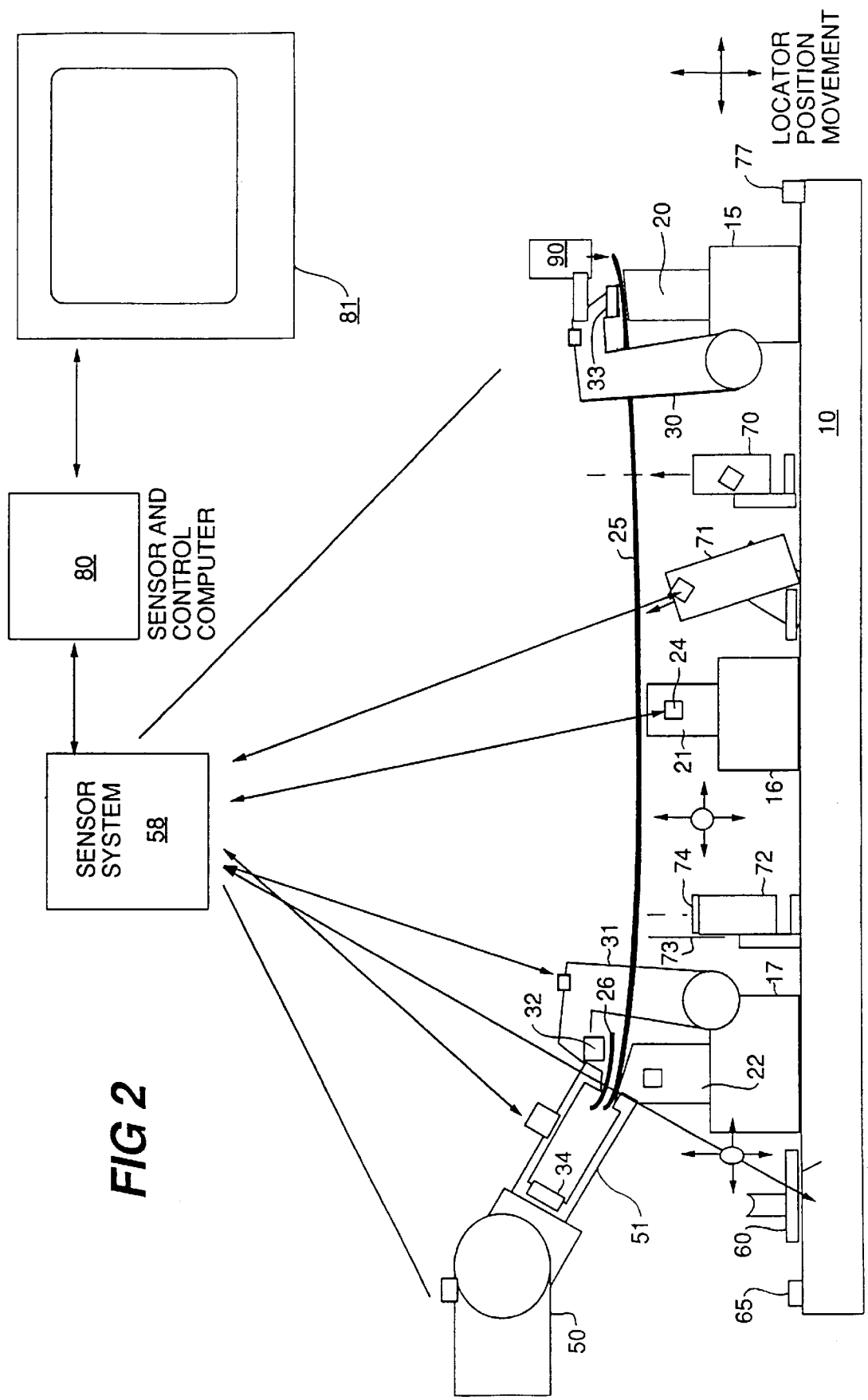
FIG. 2 illustrates the same view, after placement of both parts to be welded, with the parts clamped and a spot welding gun in place (in this case robot positioned).

In a second stage of operation, shown in FIG. 2, a robot 50 with end effector spot gun 51, each of which is also ideally monitored from the vantage point of the sensor camera such as 58, is guided with the help of the sensor camera, or at least the assurance that it goes to the correct location, and any offset thereto determined from the location of part 25, or the new part to be welded 26, and makes the welds accordingly. (See also FIG. 5 for offset illustration). This ability to accurately guide the robot gun allows immediately a reduction in the flange widths of excess steel, put onto many panels to effect a weld.

When part 26 is in position, using whatever loading device is used, manual or automatic, and the clamp 31 is engaged to hold it in place, and usually as well with other clamps down the length out of the paper of the drawing, if it is an elongate part, the part is verified to be in position by the sensor system desired. It is also noted that force monitoring can also be used to assure the force of either clamping or positioning is correct, as described in the previous applications.

At this point the weld is made, and any distortion of the metal that has occurred is also sensed by the system 58, if desired to control better the location of welds, choosing, for example, other locations if distortions are excessive, as well as to assure the quality of the part after welding. This can be also checked before and after the clamps are let off, and the part is transferred out.

Distortion can also be optionally correlated to clamping force, measured by optional load cell force sensors 32 and 33, and to robot spot gull clamping pressure measured by load cell 34. Changes in clamping force measured by sensors 32 or 33 during welding and after welding, if significant are reported to the control computer for recording in a data base, correlation with dimensional variation after welding, and possible action (e.g., tool shut down).

Locators which can be moved in response to electrical signals generated as a result of data taken are of interest. These can include simple linear or ball screw drive motors, as well as one particular type shown herein which is capable of changing the surface slope through the use of a differential screw, as well as the width of the locator as well.

Triangulation sensor 72 such as disclosed in sensor reference 1 is further shown in FIG. 2 (omitted from FIG. 1 for clarity), to measure surface location of part 25 before and after welding to assure proper conditions. For example, in improperly clamped or welded parts, shifts of up to 1 mm or more can be noted due to welding. Such an event is logged in computer 80 for data tracking and diagnosis, or in extremely bad cases used to shut down the tool for operator intervention. Similarly, bad incoming parts, detected by out of location surface, edges or holes, can be treated in a similar manner.

FIG. 3

Figure 3:
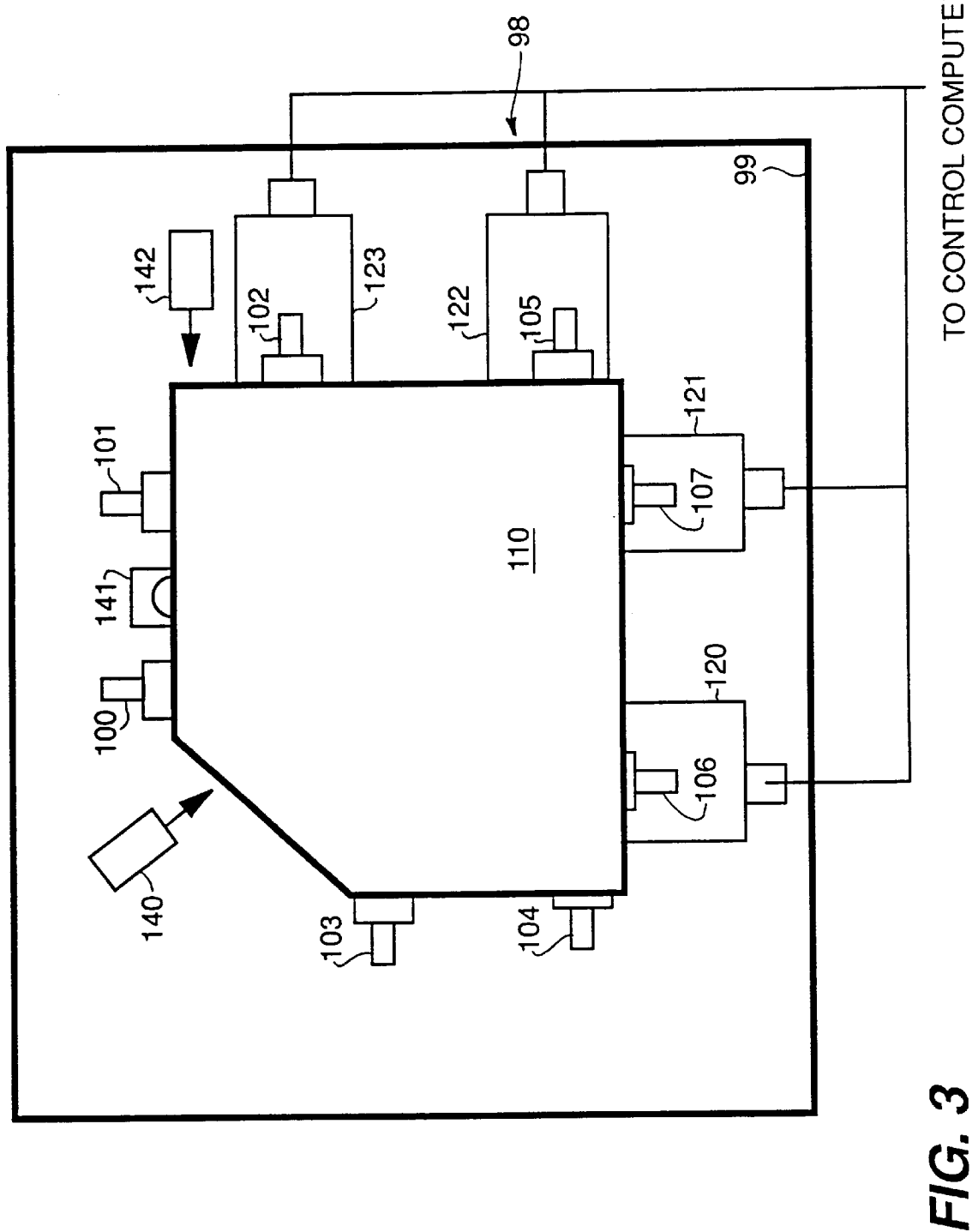
FIG. 3 illustrates a top view of a door assembly tool similar to the above, further illustrating moveable devices for locating and clamping, used either for changeover of the part to different parts, or for the automated perturbation of the process in order to develop the correct settings and the gathering and recording of data.

FIG. 3 illustrates a top view of a door assembly tool 98 similar to FIGS. 1 and 2 above, having 8 locator and clamping positions 100–107 to position and hold door inner 110, four of which (120–123) are stepper motors positionable under control of control computer 80, in x, y, and z used either for changeover of the part to different parts, or for the automated perturbation of the process in order to develop the correct settings and the gathering and recording of data.

While large field sensors such as 58 can be used, it is often most useful to use small ranging sensors such as the triangulation types discussed above buried within the tool to determine the critical surface locations, for example, particularly in the door header area, where three sensors 140, 141, 142 are shown in the tool, detecting fore, aft and in-out location variances before and after welding. Sensor 141 is pointed out the plane of the drawing and views the outer surface of the door (which is typically welded outer surface down).

Sequence of Operations—Part Welding

Before production, all locations and robot motions are desirably checked in a dry cycle (i.e., without actual assembly, and without parts). This confirms off-line programs generated for the robot, and modifies them if need be to assure that true position of the robot and its end effector locations are correct—a major advantage. It also double checks that the operator, if manual, or the system if automatic has correctly positioned the locators in their appointed locations for the part to be run. This also, as dry cycle checked further, checks that the locators are indeed the correct ones, if they have been changed for this particular application. The determination of correctness can be dealt with by codes on the NC locator blocks, such as the use of the additional retroreflector 24, relative to the first on the block 21.

Once the system has checked out, the welding operation is allowed to proceed to the following steps (as an example, many other procedures are possible with the invention):

1. First part, such as 25, is manually or automatically loaded into the fixture. It is checked for proper location and presence of holes and other key features that are required. If these are not present the cycle is aborted for the part and the part unloaded and flagged. If it is out of location at all points, it is moved, if possible, to an acceptable location. If this is not workable, the part can be reloaded and relocated. If the part in only out of specification in a certain region, and correct elsewhere, it can be moved to a best fit location for all the points of interest, so that it will not be out of tolerance anywhere. To be sure this is possible, the part can be dimensionally checked in one example for size. If within limits, then an attempt would be made to mate additional parts to it, if the process of mating (via locating, clamping, welding, riveting, etc.) is determined to be capable of bringing any remaining out of position portion of the part into tolerance. Parts to be assembled subsequently are offset to the new learned location, if desired, on the assumption that the part errors, or positioning errors will be consistent during a batch.
2. An additional part to be welded onto the first part 25 is loaded onto the system, and its position checked, if desired as well, and repositioned if necessary to fit the position of part 25.
3. When in position the two parts are clamped together, and optionally checked again to assure their position, and then assure that the clamp itself is in position.
4. When all is assured, the robotically or otherwise positioned welded gun moves in, and begins to make one or more requisite spot welds to hold the two parts together. These welds can be checked as well with the camera system to assure that they have been placed, especially if used in conjunction with other indicators of correct spot weld parameters. If laser welds are used as they can be in this case, another monitor of laser weld parameters can be done such as laser power, reflected energy, etc.
5. When the welds are complete and no further welds are required (which can be caused to be put on as a result of the inspection if needed), the clamps are released. If no further parts are to be added to the assembly, the assembly is checked briefly to assure that it is correct at critical key locations, and an inspection report is produced if desired, for example by customers or subsequent processes. Preferably, all checked data is entered into a data base to be used to assist in modeling the process and in diagnosing troubles in the process and in feeder processes thereto.

Figure 9:
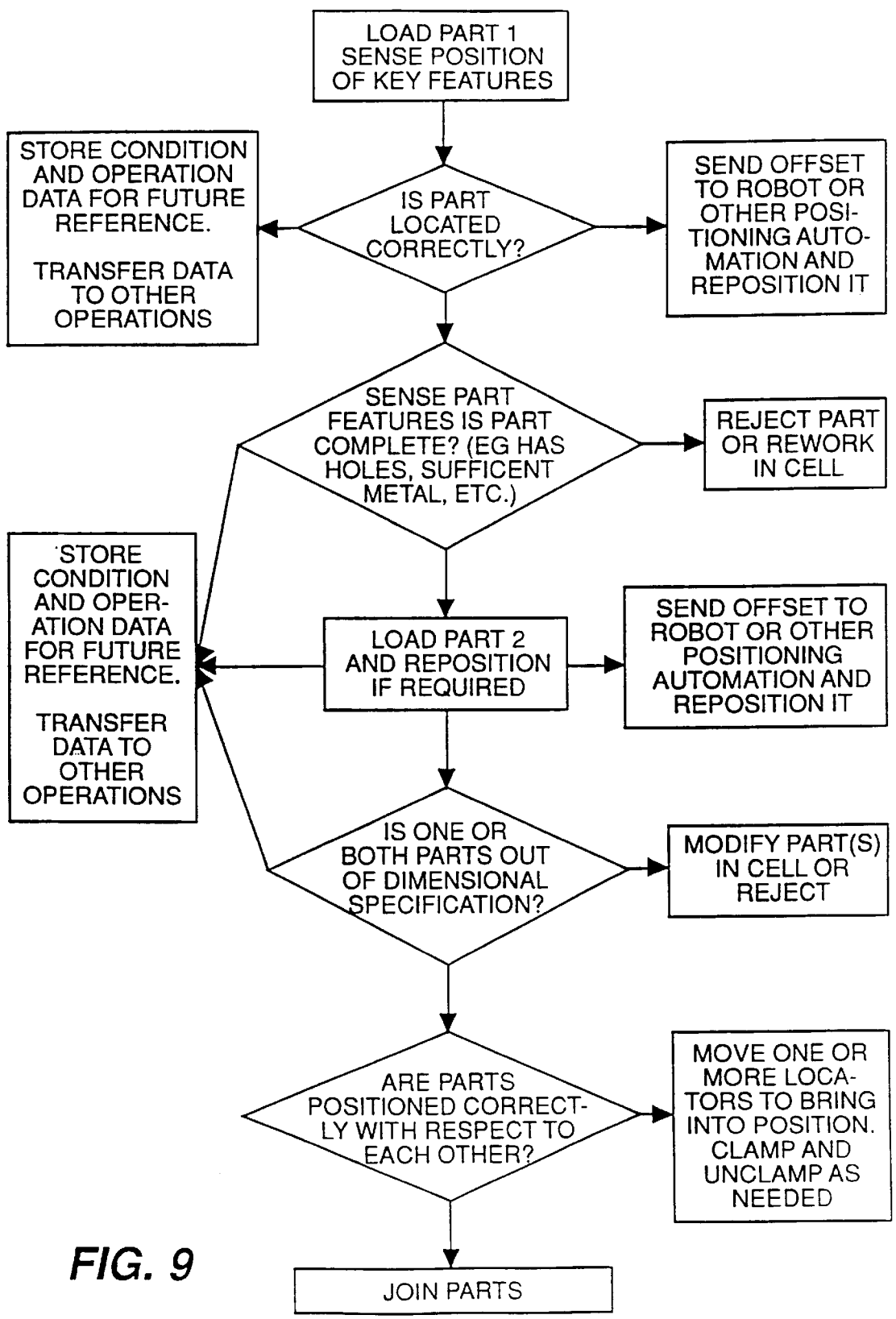
FIG. 9 is a flow diagram of a second control embodiment.

A simplified block diagram of the above is provided in FIG. 9. The assembly when complete is transferred out of the station or, if desired, other parts to be added are brought in for further assembly. In addition, when in station and also under the control of the sensor system, other processes may be performed on the part. For example, instead of the robot 50, a laser robot can be used to then trim the parts, either before or after joining in the cell, or to cut slots or tabs in the parts for further use in further assembly operations, or to engrave and mark for optical assembly purposes at later stages, such as to determine the juxtaposition of the part so welded to another part. It should be pointed out too that the sensor system 58, or the other sensors of this application can be used not only to look at features of the part, such as holes, surface locations, or edge intersections of surfaces, but also be used to align the parts via engraved or other specialized marks put on the parts.

It is noted that many steps can be eliminated in serial production if the process is in control. But during early stages of the process for learning purposes, and if quality assurance becomes a major issue, these checks can be done all the time, at some slight detriment to the production cycle, unless very fast sensor units are used. It is noted too that while the sensor systems envisioned herein are considered to be cost effective enough to be left in place, one could use them only to set up tools for different parts and to home in on proper settings during initial runs, removing the sensor system (making it available for use on another tool, for example) once the process was sufficiently stable at low levels of variability as desired. In this case, however, random errors such as missing holes and missed welds could not be detected—although a simpler gray level TV camera system could suffice for this purpose. And too, the very desirable self inspection capability of parts within the tool could not be provided.

There are several thousand spot welds in a car body. Safety factors likely dictate that if weld quality can be assured, one could easily cut back the number by 10% yielding substantial savings. To check with the invention, one can link together data electrical weld parameter data with optical parameters, such as weld spot darkness (against metal background), color and shape. Indeed, you can just have a taught pattern of what a good weld is, developed over many tries, and compare the instant weld parameters to the taught signatures. This teach mode can also be used for looking at holes, trimmed stock, etc.

Two additional sensor units are shown in FIG. 1, for higher resolution metal inspection than might be done with one overall wide field sensor 58 covering a large area or even the totality of the parts in the cell. These include a miniature TV camera with protective window 70 looking at a hole, and a 3D ranging device, such as a miniature version of the photogrammetric stereo system, shown in FIG. 5, looking at an edge of the part to determine the intersection of the two planes. This would typically be looking at those areas that have been welded up in this station, although for clarity in the drawing it has been shown checking another area of the part, let us say, that occurred in a previous station.

It is also noted that a camera system or other sensor device can be used actually mounted on the clamp to look at the edge or surface of metal directly, or other features that are nearby the clamp, to one side or the other, or above, or below. This is shown as miniature TV camera 90 mounted on clamp 30. TV camera 90 is hung at the place to look, in this case, at the edge of the part 25 to assure that it is in the correct location, relative let's say to the ensemble of the holes detected by the camera system 58. This assures that the metal has not slipped in the stamping die, and that any sort of edge of the part will be in correct relationship to the holes within it. It is noted that a really clear definition of the edge may not be obtained by sensor 58, in some cases, and localized cameras, such as 90 may need to be used if accuracies in the 0.1 millimeter range are to be achieved, as is generally desired on critical locating points or mating surfaces.

To look for missing holes and incorrectly positioned edges of the components of sheet metal or other material, the sensors can be simpler than the unit 58, for example even intelligent parts presence switches in the tool, such as disclosed in my fiber optic sensor based patent, U.S. Pat. No. 4,441,817. The principle advantage of locating the sensors in the tool is that they can be used at close range, and still clear the part that they unloaded. The close range means then that a given localized feature can be looked at with a relatively small compact lens system, and a camera that does not need a lot of resolution.

In addition, by locating sensors in concert with the tool, whether over it, under it, or what have you, we have the advantage stated in the previous co-pending applications 1 and 2 referenced above, that the part can be monitored as it is built. Parts can be monitored as they are placed in the tool for correctness and correctness of placement. They can be monitored as they are clamped to make sure that the clamping is clamped in correctly. They can be monitored during welding, as disclosed in some other co-pending applications, and they can be monitored after welding for verification that the part is correct within tolerance to send to the next operation.

Each point, for example, can be monitored and limits placed on what is acceptable for the condition within that point. In addition, one can set these limits either directly, or indirectly via master part or parts which are put through the tool, and used to set the allowable limits from the limits of the master. Or one can just teach the unit; that is to run a number of parts through (let us say a day's or weeks production), verify that those were good days, and that the production in those days was acceptable, and then from that work out the limits that could be possible. These could be as simple as just looking at the range for that day, and saying that anything with that day is okay, or it could be more involved by taking into account the multiple variable nature of all the points.

Perhaps the most useful of all sensors within the tool are those which are able to determine surface location. This can be done best today with non contact electro-optical triangulation types capable of standing off the part surface preferably at least 50 mm (for clearance, and to prevent crashes). While a variety of triangulation sensor may be used, using point triangulation, lines, and grids of projected zones, the simple point triangulation sensor is often best—and cheapest, since large numbers are used in tools—typically 10–12 on a door tool say.

A second type of useful in tool sensor is the linear array (one axis) or Matrix array (two axis) camera type, used for looking at holes or edges. Often useful for best contrast of features is a retroreflector behind the feature desired, with on axis illumination from the sensor housing or elsewhere. This has been illustrated relative to the overhead sensor 58 using retroreflective material such as scotchlite 7615 glass bead tape 60 to back light part edge 61 in FIG. 1. Retroreflective material can conveniently be placed on the clamps, such as 30 or 31 in FIG. 1, or on other parts of the tool cell, as desired.

There is an environmental issue: that is can sensor units located within the tool survive This is a lot more demanding environmentally than the overhead sensor 58 must endure (although even there precautions as here described may be required). The issues here are both electrical noise during the discharge, and optical noise due to the flying sparks, or if a laser weld, the laser weld and the molten metal. (Laser welding in such clamp locations has been anticipated by Alborante, and in our own reference 1, 2).

I have found that a small electro-optical sensor of the camera or triangulation type (70, 72 and 71 in FIG. 1 or 2) can be co-located relatively near welding guns (e.g., 20 cm), and function reliably, taking precautions to change the protective window periodically (e.g., once a day or week). However, weld guns, if maladjusted, create "weld splatter" when it resistance welds the panel, and if this is severe other precautions are needed. In severe cases, shutters, air purges, and other mechanisms are utilized whenever required to allow function in the welding environments. Sensing can occur before and after welding so that the sensor can be shuttered during welding if required For example, sensor 70 and 71 are shown equipped with shutters 88 and 89 which can be actuated on/off by control computer 80. Alternatively, or in addition to the shutters noted, shutters 88 and 89 can represent removable cover windows which if weld splatter builds up, can easily be replaced. In addition, EMI shielding and water/oil protection for the sensor internals are a must. I have found that in practice, function can often be inexpensively assured using a baffle such as 73 shown in FIG. 2 to keep weld splatter such as from robot carried spot gun 51 from landing on removable cover window 74 of triangulation or camera sensor 72. This same approach can also work for other types of sensors.

If during the operation of the above system a malfunction is detected in the tool cell, such as one of the clamps not moving to the proper position, indicating that it is not closed down to the metal, or if a part is not in place, or a robot is missing location and pulling the metal, or whatever, a maintenance person is alerted, if it is deemed to be something that cannot be dealt with by simply rejecting the part (assuming suitable part rejection mechanisms are available). When the maintenance person is alerted, the cameras, if used, located in 58, can also be used to provide an image of the cell to a remotely located maintenance area or operator station. This allows the maintenance person to have a very good idea of what's wrong. He sees the cell, he sees the clamp, let us say, that is out of position, and he sees its position flagged in red, which comes from the software in the computer control 80 to the remote maintenance display. When he then comes over to this cell, he then is fully prepared to deal with the problem, and does not have to come over, take a look at what's gone wrong, go back and get his tools, etc. In addition, one can log the occurrences of such events, including even the images of the event, of either the screen or the actual cell image, or the data super-imposed on the image for later use. This can also be used for logging the data obtained.

Some additional parameters that are varied or affected in process development and used for maintenance diagnosis as a result of a sensed condition are:

Sense that metal is distorted, or out of tolerance in one location (e.g., wavy or out of position to key locating point such as a gage hole). Move weld spots, move clamps, change clamping pressure, change robot moment to metal, add additional welds, remove certain welds, physically counter-distort metal during welding, to stress metal in such a manner as to remove distortion after welding. Note: if distortion is sensed dynamically, for example by observing with sensor system the out of position movements of the robot welder during a welding cycle, the process can be shut down immediately (to potentially save the part) or after, and the part scrapped.

Sense that holes are out of place. Blanks shifted in punch die, (or laser trim cell), assembly parts shifted with respect to each other before welding (determined by monitoring placement of parts with respect to each other using sensor system), movement of locating surfaces required, improper urging of metal by cylinders, robots, etc., open up hole, if possible using laser in cell (assuming oversize hole functions satisfactorily).

Spot welds not present or effective. Change current, weld tips, position of robot (or other gun holding device), add welds.

SPC data from independent means (e.g., CMM) indicates that assemblies are trending out of tolerance, even though not apparent to sensor system. Recalibrate system using measured part as reference.

Sensed data indicates that assembly parts are trending out of tolerance, even though incoming parts are acceptable. Move locator(s) most probably causing error (manual or expert system determined) and/or vary damping until problem resolved.

Parts not in position at all points (rigid body shift). Move part with holding device or auxiliary robot, unload part and reload, reject part.

In a similar vein to the maintenance issue, the learning function that comes form this cell is a major feature of the invention. The system can move the locators, such as 20 in x, y, or z, or in some cases, in one of two of those dimensions if the other dimension does not mean anything in a particular application, using automatically moveable positioners, if employed, or manually if not employed. In the manual case, which is simplest, but probably not of interest to most people in serial production, the manual movement is determined by the camera system and its new resting location confirmed to the operator and logged into the data base for the positions of the part locators, and other details of the tools. For the automatic case, where the vision system computer 80 has essentially given the command to stepper motors, or other means employed to move the locator blocks 20, this data, if moved in known steps, is known. However, it can always be reconfirmed with a vision system to make sure that the locator indeed, moved to where it was suppose to.

In any case, regardless of how it is moved, one can, let us say, perturbate the position of locator 20 to, let us say, 10 different possible position on 10 successive parts or, let us say, for more statistical reliability, running 100 parts 10 times at each of the 10 positions. At the outcome of each position, the quality of the part, in that area, in terms of the correctness of its location to the other locator or part positions would be determined, and the ideal choice of locator position used.

One can even have a zero position, in other words back the locator off from contact with the part at all, so that the part is forced to rest on the adjacent locators, and see what happens there. This can be done as a means of determining just how many locators are actually required, in other words, spare ones can be employed but not utilized if not required.

This is particularly interesting since many times, it is not known a priori, except through tradition, how many locators one should use. As such data is for the first time built up in data bases determined by actual part dimensions and other determined tool characteristic variables, one can more optimally design tools for future parts of similar types or functions. Thus, it is anticipated such data bases will be fed back into the CAD tool design programs generating the locations for the locators clamps and other tool details from the CAD data of the parts to be assembled.

A simple version of such a data table might be:

| (Position X,Y,Z) | | | |
|---|---|---|---|
| Sequential Locator 4 | Critical part feature Locator 5 | Locator 1 Locator 2 Locator 3 Part 1 Dev from Nominal in one direction | |
| Part 1 | +.5 mm | (20, 13, 54) | Other Data |
| Part 2 | −.9 mm | (20, 13, 57) | |
| Part 3 | +.25 mm | (20, 13, 53) | |
| Part N | etc. | etc. | etc. |

For the data present, clearly the locator setting used to manufacture part three would be chosen.

Note that the problem has multiple variables, and analysis of data may be substantial to pick the best settings. In addition, because of variations in parts, a characteristic batch should be run for each locator setting. Note too that settings can change due to incoming part variation, due to different vendors, distortion in shipping, etc. The number of locations, the number of variables, and the difficulty in obtaining any sort of data with conventional systems make such "tuning" of fixture tools problematic at best in conventional systems. The invention immediately makes this easier, and provides the basis of incorporating an "expert system" based on rules derived from experts analysis and observed cause and effects, to allow expeditious manual or automatic adjustment.

It should be possible within the run of a given batch of parts from a stamping plant, feeding the tool cell, to be able to home in on correct settings, within a space of, let us say, 10 parts to provide acceptable dimensional integrity.

Disclosed herein are both automated, that is motorized, systems for the variation in NC block or other surface locating positions of parts, the location automated systems for the movement of clamps, and the variation in force, provided by the clamps, and other systems as well, in concert with the vision system to determine where all the positions are at the time that any one particular part is made in the tool.

FIG. 4

Figure 4:
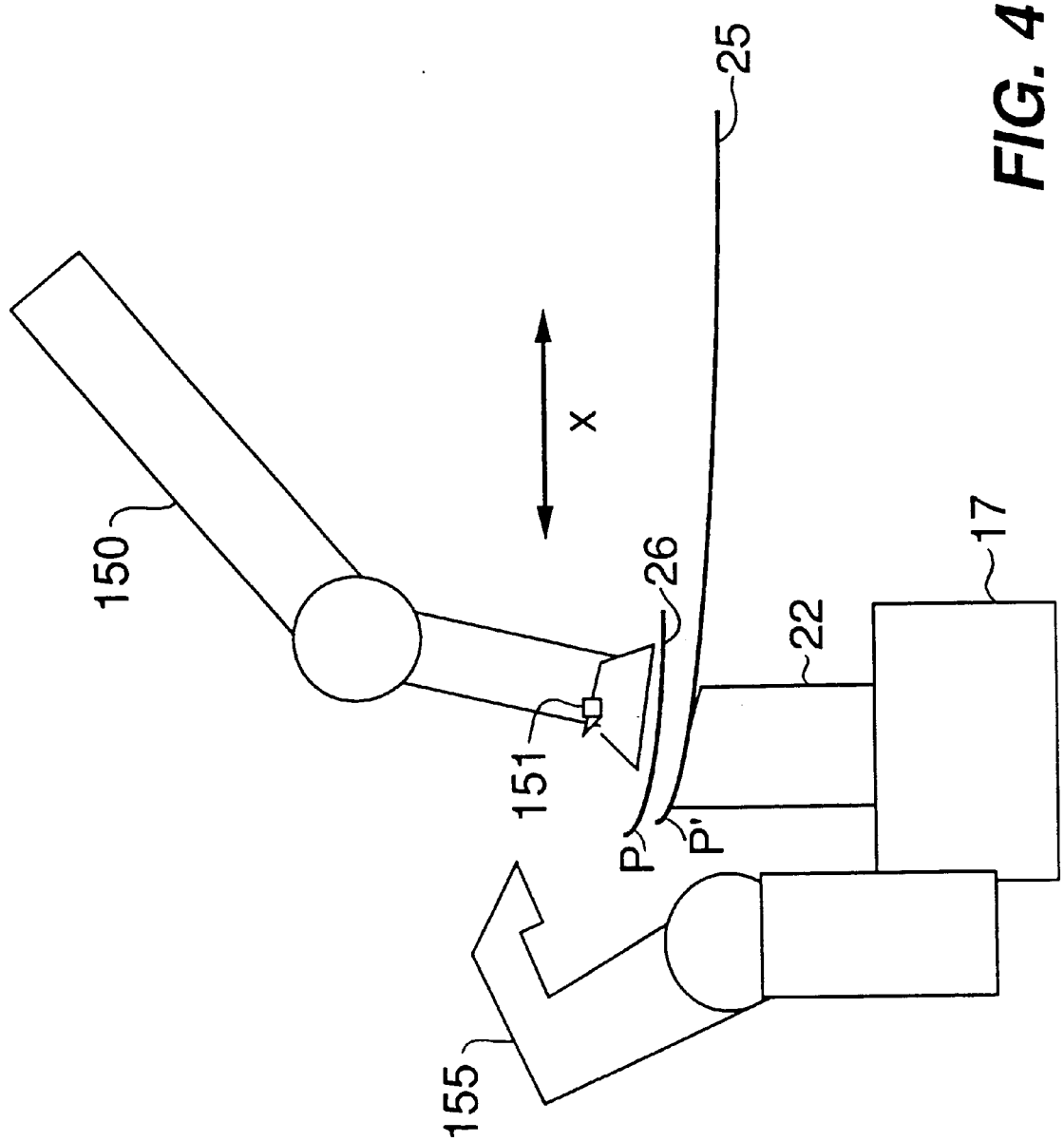
FIG. 4 illustrates a handling robot positioning, under control of the sensor computer system, a panel relative to another panel before clamping, to assure a critical dimension.

FIG. 4 illustrates a handling robot 150 positioning under control of the sensor computer system 80 (not shown for clarity), part 26 relative to part 25 before clamping, to assure a critical×dimension between points P–P' of the parts is obtained—which could be edge to edge, edge to hole, hole to hole, hole to special mark on part (e.g., laser engraved), or any other pertinent feature relationships. Positioning is facilitated if slip fit parts are utilized, but requires close guidance of the position device (which, as disclosed in my referenced applications could be a human looking at a display which would be driven by the sensor unit looking say at a reference datum on the robot such as 151, or at the part or parts and guiding him as to where to put the part). If after clamping with clamp 155, the part becomes distorted and P–P' changes, an estimated location for best results after clamping can be predicted by the computer system, and part 26 unclamped, repositioned to that location, reclamped and welded.

It is noted that select fit is possible, where the choice of a part size or shape to be mated is based on the part such as 25 to which it is to be mated, or to fit a further assembly which has been measured and data known to the matching operation.

It is also noted that if desired, a robot such as 150 can be used to push on sheet metal part 26 slightly after welding, so as to deform it to have the correct shape, under control of the sensor system. This is a short term expedient to correct for problems in the die, or in shipping the panels, which often distort in transit. Note that a laser or other heat source can be used to soften the metal to make such controlled deformation easier. In the case of rigid parts, the modifications are usually limited to providing a metal removal operation if the part has been assembled.

The robot is thus guided with the help of the sensor overhead or one or more sensors within the tool (e.g., such as 71 or 70), or at least the assurance that it goes to the correct location, and any offset thereto determined from the location of parts 25 and 26 and makes the welds accordingly. This ability to accurately guide the robot guns allows immediately a reduction in the flange widths of excess steel, put onto many panels to effect a weld.

When the weld is made, and any distortion of the metal that has occurred in the assembly is also sensed by the sensor system is desired to, for example, control better robot position, or the location of welds—choosing, for example, other locations if distortions are excessive, as well as to assure the quality of the part after welding. This can be also checked before and after the clamps are let off, and the part is transferred out. This has proven useful for diagnosis.

FIG. 5

Variation in parts can be reduced by the system here disclosed by use of optimal design, and adaptive techniques such as FIG. 4 above to optimize the fit of parts made available to the system.

Figure 5:
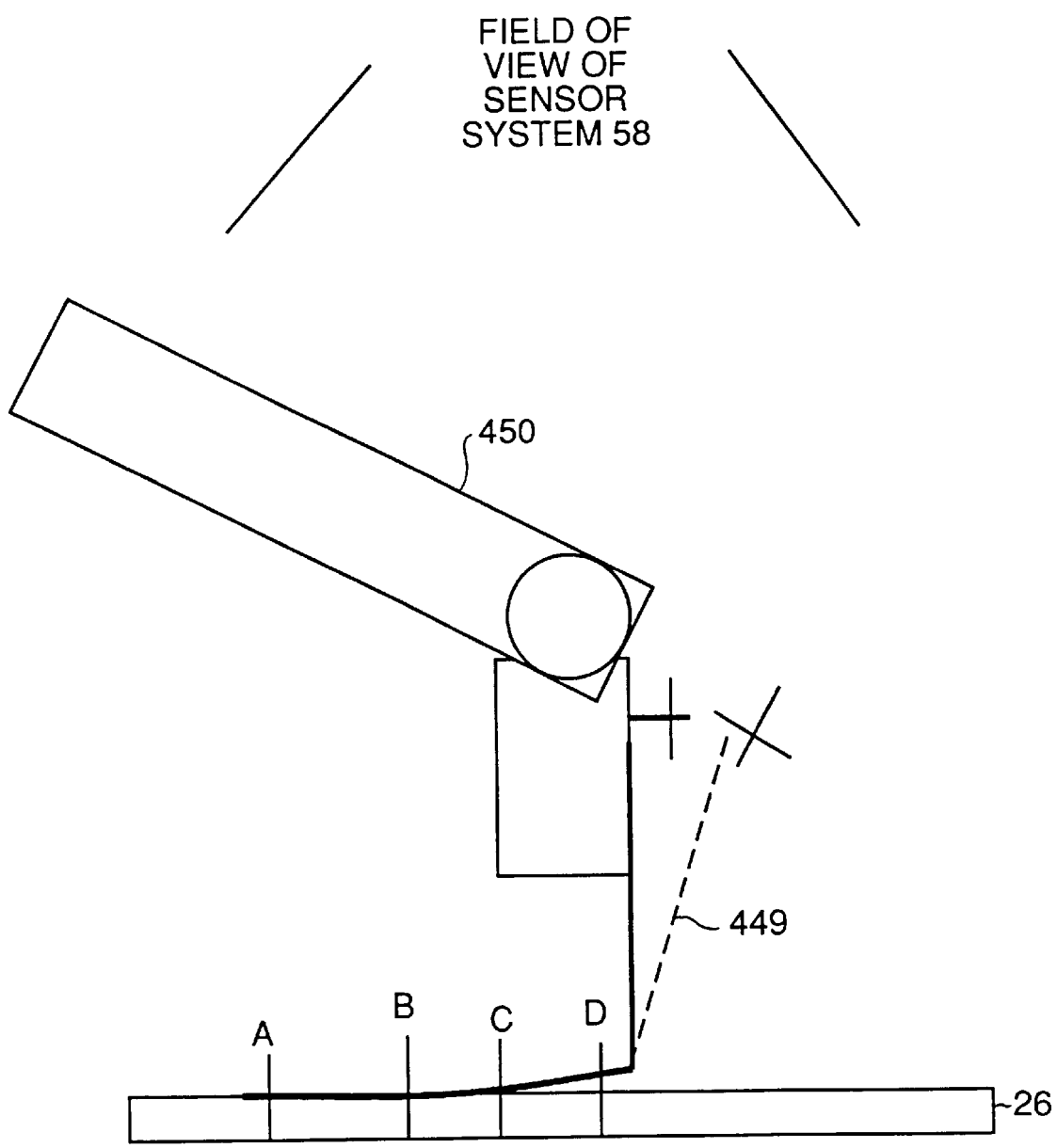
FIG. 5 illustrates the "fixtureless" addition of a bracket welded to the sidebody assembly of FIG. 1, and the use of force sensing.

FIG. 5 illustrates another method, using controlled part distortion to achieve a proper hole location. Shown is addition of a part 449 to the assembly joined in FIG. 1, using a robot loading mechanism 450 to place part 449 on the previously jointed section 26. This, however, is placed on in a fixtureless mode, as has been illustrated in copending applications refs. 1 and 2, wherein the fixture, which has been used to join the previous parts, is not used to join this small bracket, which instead is tack welded using weld gun 51 at point A, and then welded again by the gun at point B, C, or D (or any other number of points as desired), as a function of the actual position of the bracket as determined by the vision system.

This choice of weld strategy is one of the examples of the invention, where the actual points of welding the slightly curved bracket are chosen such that the particular hole in the bracket ends up in the correct location as determined by the sensor system, (e.g., 58) or as learned from some other aspect of the invention, such as previous welds or the like. Indeed, the higher the letter, that is toward the letter "D", the more the bracket will point the hole to the right in the sense of the drawing. The more toward the letter "B", the more it will be to the left. The correct choice is then determined and the weld gun comes in, clamping the bracket down with its own actuating force and putting in the weld. This is one example of welds that can be applied in such a manner as to purposely cause the distortion of the metal in a desired direction. Other much more complex examples are also within the realm of this invention, including not only the choice of the location of the welds, but the number of welds as well. The same holds true with holes, and fasteners, and other types of joining systems.

Weld strategy can also include not only the choice of location of welds between pieces to give the optimum final assembly shape or dimension after consideration of distortion effects due to joining of possibly variant parts, but only the choice of the number of welds, if structural concerns are met. For those welding processes such as laser welding, where a bead type weld is produced, the length of the bead at any given location on the two parts can also be so varied to produce the optimum dimension of final parts—either the instant part, or more complex, the assembly into which it is to be assembled.

FIG. 6

Figure 6:
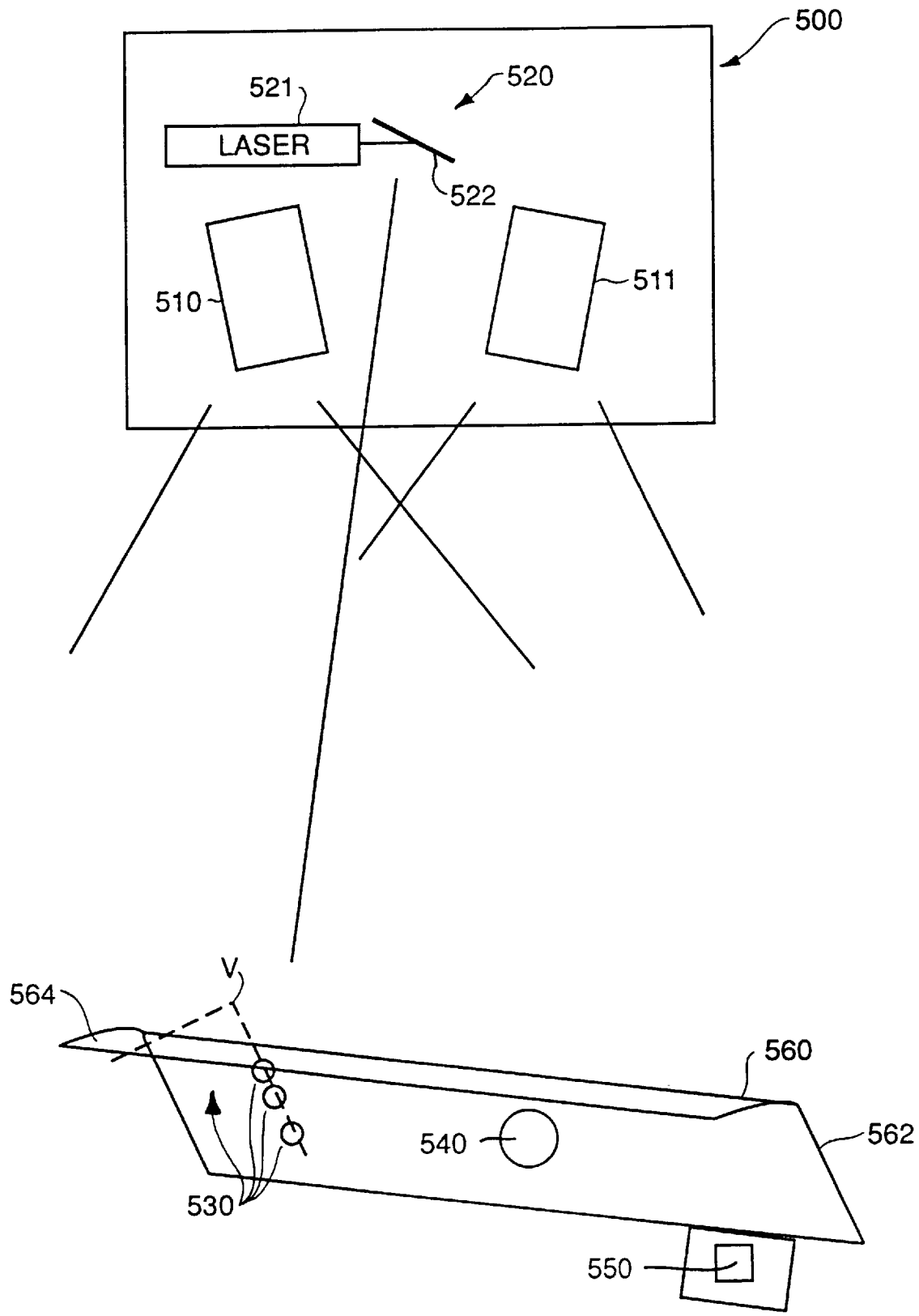
FIG. 6 is a further illustration of the use of a photogrammetric system to measure part shape, feature location and tool datums.

FIG. 6 illustrates further the preferred photogrammetric sensor unit 500 to measure sheet metal or other parts as was disclosed in references 1 and 2. It is comprised of stereo TV camera pair 510 and 511 and laser spot projection unit (or other artificial targeting system) 520 comprising a switchable laser source 521 and two axis randomly programmable two axis galvo scanner (mirror 522) controlled by sensor controller 80. Not shown for clarity are necessary illumination of part holes or coaxial illumination with the cameras desirable for retroreflective target datums if used.

The creation of data required for calculation of the vertex V of a rolled sheet metal edge 560 is depicted using three spots 530 projected on one-plane of the surface 562 and three more on the other 564, not shown for clarity. Straight lines are fitted to the two sets of three points (two points would do but three is better) and the intersection or vertex V at the edge is calculated. This is used by many CAD systems to denote the edge of metal, and is the best descriptor in the case of bent sheet metal.

Also shown is the determination of a hole location 540 on the part and an NC locator reflector 550 nearby. The time to measure up to 256 well defined points in 3D space is typically 3–5 seconds using Dell 486 PC with Matrox 1200 image processing board set. Solid state TV cameras are RS170 Coho brand. Algorithms are stereo image matching and photogrammetric types developed by National Research Council of Canada in part for the space robotics program, with added features for precision centroid determination.

Over a measured volume range 500×500×200 mm, the following results can be obtained, which are sufficient for use of the invention:

| Axis | Part Hole | Repeatability Locator Reflector | Surface Point |
|---|---|---|---|
| x | +/−0.22 mm | +/−0.15 mm | +/−0.32 mm |
| y | +/−0.22 mm | +/−0.15 mm | +/−0.32 mm |
| z | +/−0.3 mm | +/−0.2 mm | +/−0.4 mm |

Clearly, the more field of view over which a given accuracy in locating a point on the surface of the part or tool locator, the more generic the sensing system becomes. However, accuracy of, let us say, one part in 5,000 to 1 part in 15,000 of the field of view is quite hard to obtain today, given the present restraints on camera size, image processing members, and the like. Fortunately, for locational purposes at least, position measurement accuracy of any one reference feature often is not the issue, but it is, in fact, the ensemble of all sensed points on the part, when fit together, that determines the part location. Because one can fit through least squares or other methods, a nominal part surface to an ensemble of points, each one which may have certain errors, the summed error of the fitted surface location can be substantially less than the error at any one point.

For example, if reference point P' in FIG. 1 is shifted to the left by an apparent 0.1 mm due to the error in the camera reading, a similar point, at the other end of the part, viewed by the same camera (or if a large part, another camera) for example, generally speaking would not be so shifted. The sum total of all errors then, in locating the part surface would tend toward the nominal location, at least statistically.

It should be noted that one only needs to measure the part at those extreme points (which in a car mate to other part surfaces), or other locations such as holes, where critical reference points are needed. It is not necessary, for example, to have cameras able to see accurately everywhere, if the part is falling within the cell, only reference points in certain areas.

It is also noted, as well, that it is in the invention to only use a portion of the camera field, where the particular part feature is thought to be located. This is particularly easy to do in the tool case, where one can actually teach the system where it is during the set up phase. In this case, a window in the computer image field can be put around the particular area, and only processing done within this window. This speeds up processing proportional to the reduction in the area of the camera system so utilized.

Finally, it should be noted that one might wish to take a great deal more points, than would normally be required. For example, we mentioned using seven above to give us a statistical basis. But one could always have outliers, and therefore the larger the number of readings, the closer the fall as a statistical mean. In short, one might wish to measure 100 points, many of which would not be really accurate datums, but might be discernable as features. This would be particularly easier to do, if we put special datums on these parts just for this purpose, to increase the accuracy for example, as in the use of laser engraved systems in a trim operation in the stamping plant for example.

There are two calibrations issues—the sensor system proper, and the assembly system or cell. In some cases where a master is used, both can be calibrated, at least over some volume, simultaneously. Reference 1 illustrates precalibration of the sensor system, and calibration over the volume of the cell using tracking interferometers and other means. Illustrated here is one of the optional concepts discussed therein, using a target plate 175 shown in FIG. 1 located on four mounts such as 178 at a known relation to the system base 10, to calibrate the sensor system, both 58, and the such as 70 mounted to the base and pointing up (in the case shown) at target 180. A special target plate for each part can be used (manufactured in situ, or via CAD design information), or a generic plate, with targets on 20 mm centers, say.

The system can be calibrated by using specially targeted master parts, which typically either could be made of special materials as masters, or, as is often the case, simply made of regular stamped parts, which have been checked on a CMM, called a "silver" part in the trade. However, unique to this invention, is the use of specialized target points, not just the regular surfaces in the material, which can be seen easily the camera system. These points might be quite different, but perhaps nearby to those points normally viewed. For example, they could be retroreflective tape dots put onto the "silver" part in exactly those locations where the tool was, for example, the tool locator surfaces, except that instead of being on a tool locator surface they would be on the opposite side of the body metal, on the other side of the surface.

Whatever offset that this represented would have to be figured in, when one wishes to check where the tool location was. However, since the body metal has its own thickness, and it was pre-presumed to rest in the tool, this part could be used to check the sensors such as 58 that control the tool. This is not that risky for two reasons. One, the cameras are digital and are generally able to interpolate across the small regions of their field without significant error, and two, in some ways the use of a targeted part, known to be good and of certain dimensions may be a better check of the tool than to measure the tool itself. This is simply because the tool positions may not accurately indicate the finished part positions, and it could be more effective to set up with the part. However, in reality it really doesn't make much difference, because essentially we are taking known datums wherever they are and calibrating the camera system. The part, by definition, for that particular tool, has the target datums in the right places, since they are the places near the tool locations.

Use of the 'silver' parts however, for calibration of a generic parts assembly work cell, can create substantial problems in that we are actually truly trying to calibrate the sensors over the whole volume, and operable over this volume, for at least the most generic cases. Note that for normal purposes however, we wish to do one part today, and perhaps another part tomorrow. For any given day, the calibration really only has to be around those areas where the parts of today fall. It's only when one intermixes parts through the whole volume that one has the problem of calibration over the whole volume at once. This an important point, and simplifies substantially the calibration issue.

Suitable retroreflector designs for use on the locating blocks, or robots, clamps, or other details, are glass corner cubes, glass beads, and particularly versatile, glass bead type "scotchlite" material. While retroreflectors are desirable, white spots on black backgrounds, holes in metal objects (which appear black, or bright, if back lit), or other contrasting target datums can be used.

Retroreflectors can be set, if desired, into holes NC bored in known location with respect to the blocks forming the sheet metal locating surface such that the physical center or the center of the edges of the retroreflector can be directly related to the surface location desired.

FIG. 7

Figure 7:
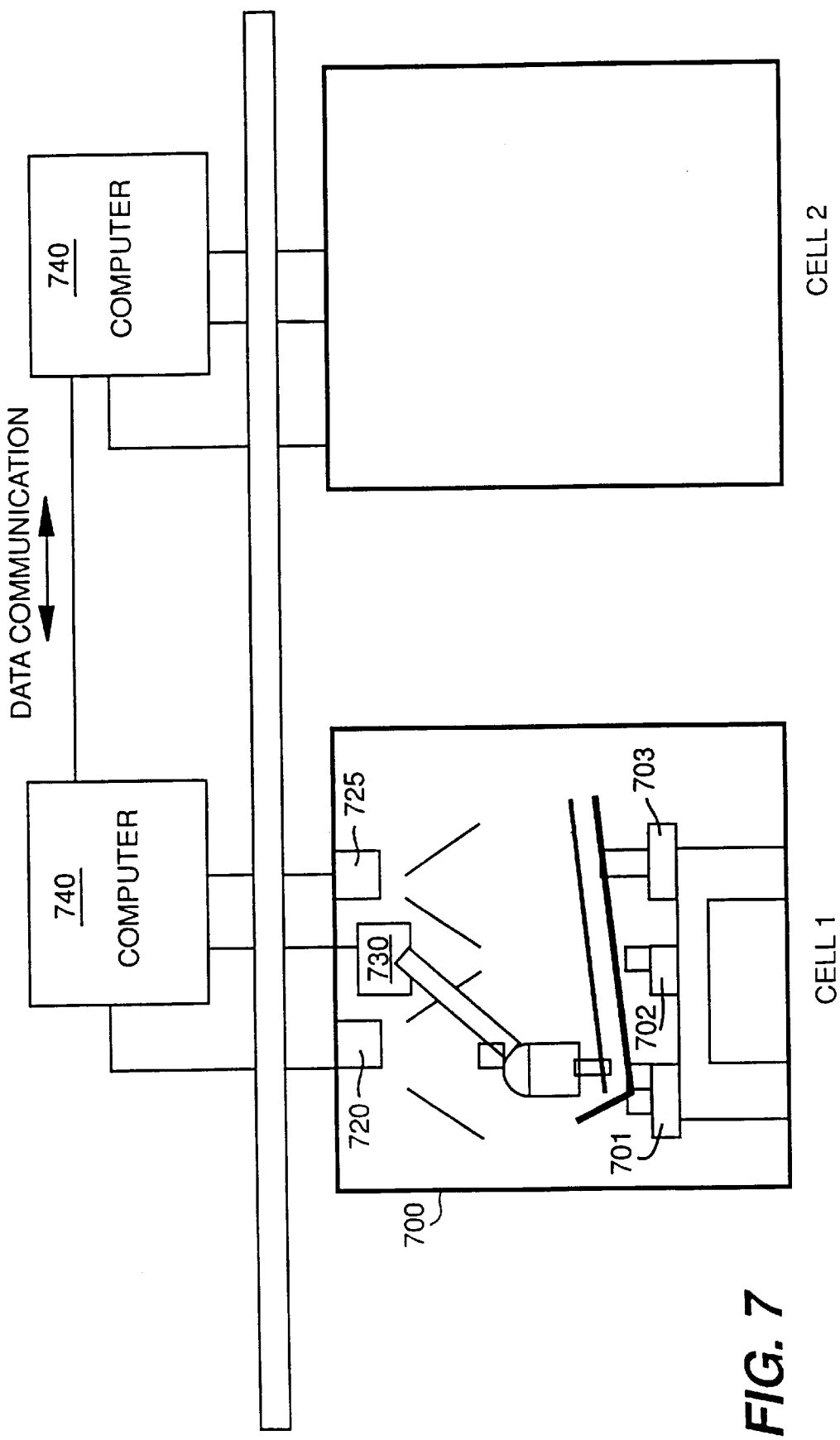
FIG. 7 illustrates two stations in what could be a line, or composed of other stations as well, for assembly parts with the tools of the invention, and as well as the use of the invention with data in those stations, as well as in the press shop, etc.

FIG. 7 illustrates a standardized assembly cell 700 for precision assembly of 2½ dimensional and 3D parts positioned according to the invention. It uses many of the components illustrated in FIGS. 1–6 above in a standard design for such assemblies, at least within automotive and possibly across industries, such as the airframe and automotive industries, to provide dual use factories in peace and war. Such cells can also be used to insert parts into holes, fasten parts together with fasteners, seal surfaces, arc weld and other common assembly tasks. Smaller such cells can be used for assembly of components of photocopiers, computers and the like for example, as well as smaller automotive parts if desired.

In this standardized cell, a modular set of locator blocks 701–703 are used, which can be located on 3 axis positioning details, any of which can be motorized with other standard step motor or servo motor positioners. Other possible means to move locators have been described in the referenced applications and include magnetic, or other types which can be slid around, or otherwise moved around on the base. Standardized robot modules are located within the cell, as well as standardized vision modules, such as 720 and 725, to allow operation as has been described above.

In the case of sheet metal, the press load type automation, using vacuum actuated suction cups and the like can be equipped to load and unload parts between cells, or to even load different parts into the same cell to be added to those already made, if that can be done without the requirement for additional fixtures, or if such fixtures can be programmably or otherwise added.

A laser robot device such as 730 under control of the central computer 740 connected to the sensor system is shown which can perform many interesting functions as described in my above patent application references (especially references 1 and 2) and herein. For example, it may cut holes or trim excess material in the cell, desirably in some cases in the after joining condition, when final part sub assembly dimensions are established, and sensed, taking suitable precautions such as air or magnetic devices to remove the waste material. (The sensor system in this case provides a check that there is no harmful residual material on key surfaces or components). The lasers work itself can be checked by the sensor system.

The laser can also be used to selectively cut slots or tabs into the material at known locations to accommodate assembly with additional parts. These can even be "cut to order", if one has determined the dimensional relationships of the mating part(s). This latter capability allows one to keep building the overall error to zero of a group of assembled subassemblies. The laser can also mark parts in critical locations for additional sensor based assembly operations, or for other uses.

If desired, the gathered data base for the assembled part after all operations are complete in the station, can be passed on to subsequent stations or operations for quality tracking purposes, and to assure the best possible mating scenarios, without the need to remeasure at the next station or operation.

FIG. 8

Figure 8:
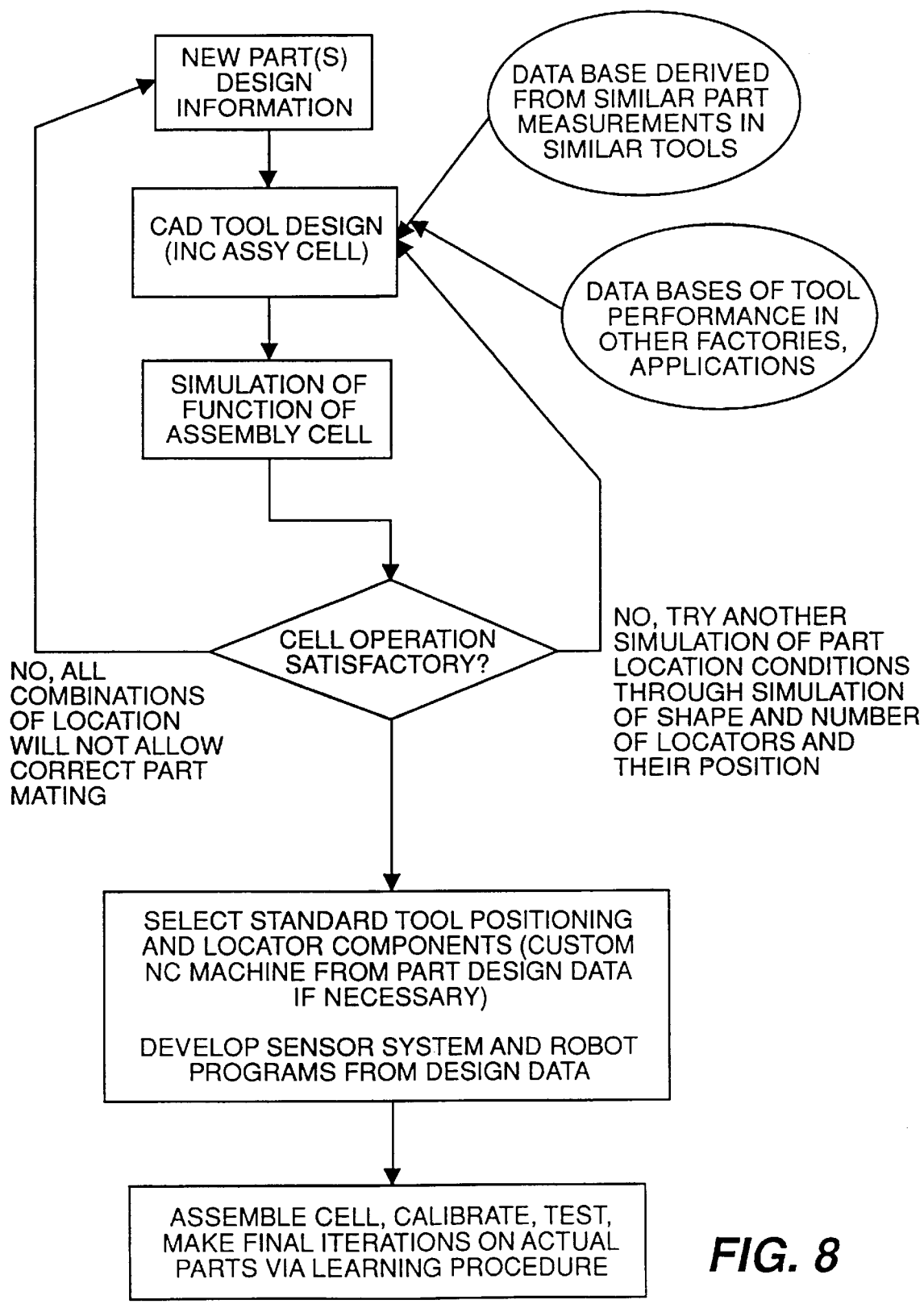
FIG. 8 is a flow diagram of one control embodiment of the system.

FIG. 8 is a block diagram of part and assembly process design and simulation. The part assembly process is simulated and different designs are tried in conjunction with information gleaned from the sensed actual data base from the same tool on previous parts, and on similar parts in other tools. The correct dimensional variation of the part is therefore predicted, and any steps needed incorporated into the CAD design of the tool. In the case of an automatically repositioned tool this design is fed to the tool directly, the robots reprogrammed, and the locators moved and reconfigured (or changed) as appropriate for the new part situation.

FIG. 9

FIG. 9 illustrates a block diagram of a control embodiment of the system at the tool/cell level for a sheet metal welding application of the invention.

FIG. 10

Figure 10:
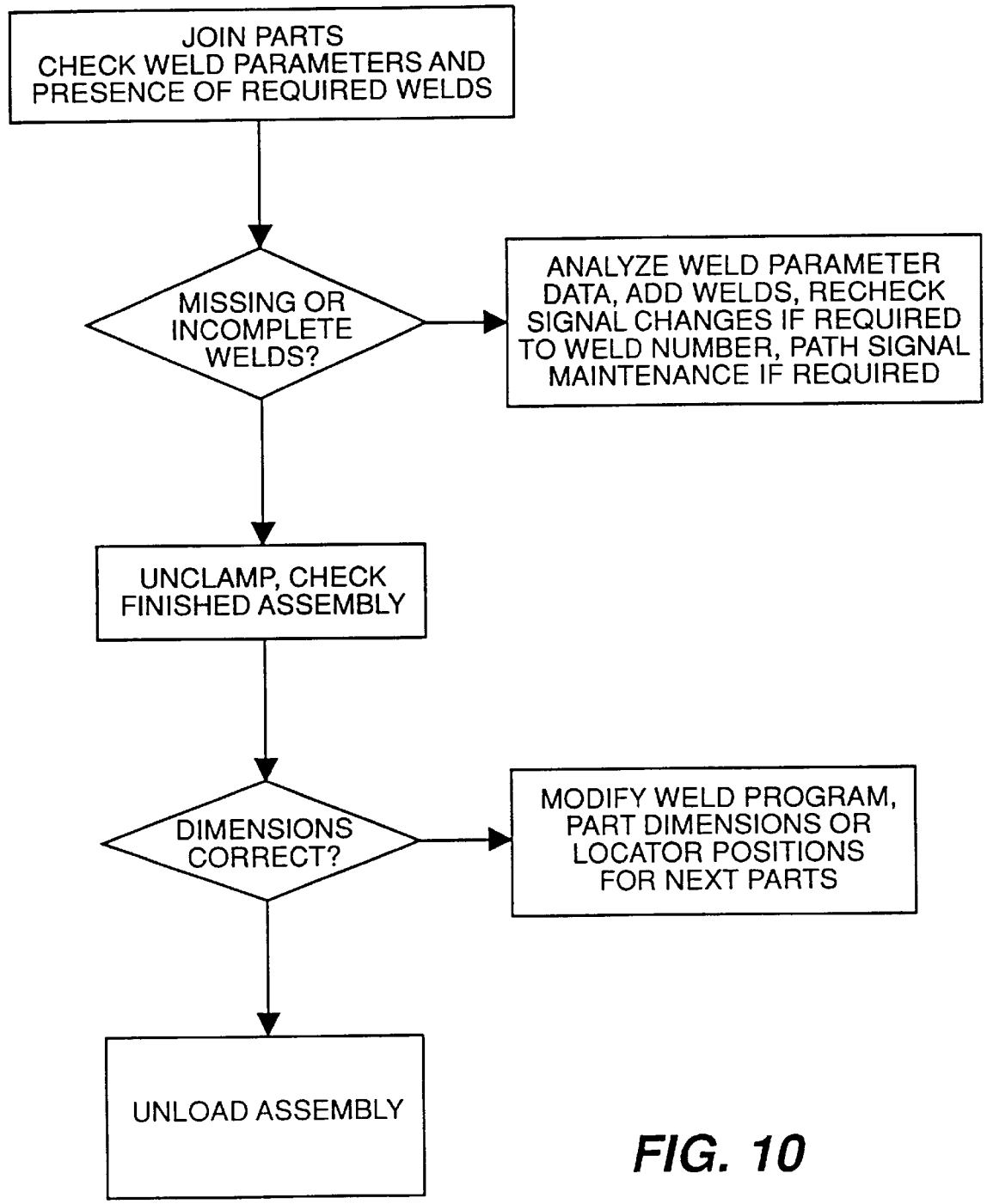
FIG. 10 is an additional flow diagram.

FIG. 10 illustrates a block diagram of a control embodiment of the system at the tool/cell level for a sheet metal welding application of the invention.

FIG. 11

FIGS. 11a, 11b and 11c illustrate an aircraft example of the use of the basic arrangement of FIG. 1 to assemble the airfoil sections such as 200, machined with flanges 201 and 202, to which a sheet metal "skin" such as 220 is to be riveted. In the first part of the operation, the airfoil sections are themselves clamped by hydraulic clamps such as 225 and 226 to the locators such as 240 sticking up from the tool bases 245 (manual or motorized riser base) by a manual operator under guidance from the optical measuring system similar to FIG. 1 system, which tells him where to put the section 200, relative to the co-ordinate system of the cell, and to the desired CAD manifestation of the finished tail section member.

When he has this in the correct juxtaposition and clamped down, the correctness of this is confirmed by the sensor unit, and the operator is told by the display to go to the next step. In this step, he then clamps the skin to be riveted to the flanges 201, etc., with clamps, again under guidance from the system displayed. Robot 250, equipped with a drill head (not shown) and interchangeably a riveting tool head 270, comes in and drills the rivet holes, according to the CAD system, after which rivet head 270 is switched in and used to drive rivets in the holes. For maximum accuracy, the retroreflecting or other target 280 on the rivet (drill) head is detected by the optical measuring system, and suitable control procedures used to guide the tool head used in the proper position relative to the flange and skin. If the skin is unknown in its location, a premeasurement cycle using the vision system can be undertaken and if desired, a laser pointing device can be used to indicate where the hole would be drilled on the skin—for example at the intersection of two laser beams driven by the CAD system—to assure the position is known. Alternatively the skin can be pre-targeted with white (or other color) marks such as dots, retroreflectors, or simply initially drilled holes to aid in this determination of where the final rivet holes should go. When the rivet holes have been drilled through, they can optionally be inspected using the same robot and a hole inspection probe, used either with a contact optical device of my invention reference 8 or of other capacitance types used in the rivet hole inspection art.

When the rivet hole is done, the robot then moves on to the next hole location, until all of the holes in the flange are complete. The riveting head located on a second robot then is used to drive the rivets through and upset them into the holes. At the end of the process and throughout the process, the holes, the rivets, the head heights, etc., can all be inspected using the vision system, perhaps even carried on the robot. Indeed, sensor units can be located on the end of the robot, homing in on the hole marked on the skin.

Note that during operation it may be desired to apply sealant at various points in the process to seal the inside of the structure, if it is, for example, a wing section used as a fuel tank, and to prevent corrosion around the rivet holes.

Because the measuring system 58 in its ultimate correct form is capable of determining position of objects within the field of view with respect to an absolute data base, the hole locations need only be stored into the computer, having been corrected for their relative locations to the fixture locating details of the members. However, pre-targeted skin can also be used where the optical system picks up on the targeted dots, for example on the skin, and guides the robot accordingly. Such targets, for example targets 291 in FIG. 11b, can be single points, or groups of points capable of giving an attitude pitch and yaw and roll dimensions as well to the camera system. A similar camera system, such as optional camera 290 shown can also be on the robot, as was disclosed in co-pending applications.

The camera system can also be used to check references to other sensor units that are installed within the system, such as the 3D laser triangulation or stereoscopic sensors, in order to establish lines of reference relative to the tool co-ordinate system.

FIG. 12

FIG. 12 illustrates a real time computer (i.e., weld line monitoring and diagnostic) system 800 of the invention, suitable for lines of tools and welding operations. This control system is depicted here for production of the car body 804, also called the "Body in White", or the "Body Complete", and utilizes the novel sensing aspects of the invention to insure maximum up-time and efficiency. A central controller or computer 802 monitors the PLC and robot controllers of the clamping and fixed weld framing station 806, and the robots 808 weld parameters. In addition one or more of the following are monitored:

a) robot or weld gun position via targeted datums thereon, and cameras 810 overhead to assure proper programmed location has been reached;

b) sub-assembly dimensions measured with a vision gage at the end of the line or other monitored section of operation;

c) clamp/locator position with cameras; and d) clamp pressure. (Optional).

A major advantage of the invention is to allow the maximization of "up-time" of body production lines, even those of the prior art. In order to maximize such up-time, it is important that all the critical variables that effect body production to be known and controlled. Such control can range from simply knowing that a switch is failing to the actual knowledge of the physical positions of various critical components to the knowledge that the weld currents, etc. that are used, or laser power levels and other factors are correct.

As shown in FIG. 12, a central control unit 802, for example running on an IBM PC, is connected to the programmable logic controllers (PLC's) that reside in the clamping units for the, let us say, body-in-white gage or fixture 812, and obtains therefrom the knowledge that the clamps have made or have retracted, and if desired clamping pressure. Similarly at the other end of the line, the inputs from the existing optical gages were used, or any other gaging systems that may be applicable, such as CMM's and the like are inputed, together with the knowledge of what particular job number is being worked on, so that all variables related to the production of a single job (i.e., one particular car body) can be linked.

These are the basics of the invention that apply to existing lines. However, very importantly is the addition of further datums that result form optical embodiments here depicted in the figures herein included. These are, for example, optical sensors to determine the position of robots such as disclosed herein, whether they be positioning robots for locating blocks, or welding robots, and where the targets could be on the weld gun, as shown.

In addition, targets can also be on the locators, and observed by cameras 814 of the invention. Thus inputs as to where locator positions are, where robots are in space at the time of weld, and as well as all of the other variables of the line, are inputed into the control system, and a critical analysis made between the various positions and the effects on the dimensional integrity of the body, such as determined by the gages.

Since there are a very large number of variables including several hundred, if not thousands of switches and other details on such a line, as well as the various pressures, weld currents, robot positions in as many as six axes each, clamp locator blocks as well, this is a great deal of information. For this reason it is also desired to prioritize this information to track only those critical points at least on a real time job to job basis that cause the problem. For example, let us consider that a dimensional measuring sensor of the final gage begins to detect that a particular position on a critical door opening is trending toward the outer limits. As it does this, all those particular variables that effect that area, which could be three or four NC locators positions, several robot positions, welding in that area, certain switches and clamps, etc. all then become tracked, with other less critical or demanding tests put into the background. A signal is sounded in case locators need moving, or the locators are robots automatically moved, if such feedback is capable.

It is noted that the optical sensors herein, which are preferred particularly those that use digital diode arrays, are drift free and stable in the manufacturing environment. When welding operations are done in a tool or when carrying out heavy machining operations, it may be necessary to shield these sensor units with a shutter, or air purge, or both in order to permit the sensors to read, which may only be 1/30th of a second, to take a frame of data during the cycle, without undue contamination present on their window. This same protection may apply as well to retroreflectors which can be used such as glass bead, or glass cats eye, or even retroreflective tape covered with glass or plexiglass buried into the various features, such as robot end effectors, robot joint tooling locator blocks, clamps, and other device which are desired to be sensed, including the key reference points on the periphery base of the tool.

Of interest too, is that not only can such locations be moved manually, but with the optical or other measuring system 816 in place to actually take the data as to where everything is, the manual operator can still make the necessary movements without having to worry about how far he moved, writing it down, and all other problems that ensue. It is for example, relatively straight forward for the vision system to absorb several hundred data points within the field of view in three dimensional space, certainly to monitor the position of all of the devices, such as clamps, locators, etc. (such as illustrated in FIG. 1).

Typical maintenance issues that could be addressed would be problems in the robot location, problems in locating and clamping, and the like. All of these can be communicated uniquely with the invention's capability of a direct visual display of the work area, including the locations in question, which could be marked in red, where they are defective. Retroreflective datums on tools, robots, etc., as well as actual part locations, can also be marked in red. This allows much quicker and more intelligent maintenance, since the maintenance persons typically located remotely from an automated line or cell, can come knowing what they have to fix ahead of time. This is similar in concept to that illustrated in copending reference 1, FIG. 5.

It is also noted that the communication links can be used to remote the displays of data taken by the tool, or the group of tools within a line, for example, and sent to quality control, or production areas to allow the continued analysis of the dimensional variability, and the way in which variability in one portion of the process matches the dimensions of parts created in another. Indeed this itself leads to a further form of intelligence; that is where an engineer looking at such data can actually himself override the system, let us say or activate it, if it is desired to leave it dormant for a given run, and cause particular things to be moved in an attempt to use his own insight into the process to better produce the parts. Taken to an extreme one can also use the same system to produce matching parts.

For example, in one simple case, it could be known that Line B, making a door that has to fit into an opening in the body sides being made by Line A, was making such doors oversized. Again, here we may be talking only of a fraction of a millimeter. The invention could be used manually, or automatically to feed data back to the body side station, to actually move the tooling in such a way that the door opening became slightly larger to accommodate the slightly large doors. Or the data could be fed back to the press plant area if substantial form changes were required, such as how one clamps the metal in the die, or even conceivably change the die (obviously not in real time) to allow this better matching of parts to be made.

The above processes however, become somewhat easier in the case of the aircraft components, which are typically machined from solid materials. In this case, the feedback from the assembly fixture can be direct and immediate to the machining processes making the next parts. Indeed, in the aircraft context it is also possible to first set up the tool using the movable locators and clamps manually (there would seem no need for an automated one, with the volumes as low as aircraft), fix the parts to which the skin, is, for example, to be assembled in position, such as the two wing sections shown, and then measure with the optical system to determine just exactly how the skin should be cut to fit. Conversely, the skin can be made first, and the panels located such that they fit the skin the best, again using the ability of the optical system to gather the data from the parts, as well as the tooling positions, to optimize the two. Indeed, one can essentially roughly locate manually the tools and then use small motorized positioners on the tools, as has been disclosed amply to make the final movements for optimization of the locations.

It should be further noted that expert system capability can be built into this invention. For example, based on previous successful moves, either undertaken automatically by the system, or indicated to the system by a human expert, or a group of experts, one can actually make suggestions to an operator or an engineer how to move the tools around to maximally reduce variability. One can also do this to the designers of the parts, and one can take data from one particular part going into a larger assembly and use it to help design or modify the tool of the other portion of the assembly that mates with it.

Also, a goal of the invention is to illustrate the distribution of sensing between processes, or steps of processes. In this case, sensed data taken at two or more stations on a line, for example, can be combined to give a better feel for the part's overall characteristics. This is particularly true where certain parts are added to, let's say, the body side in one station, further parts are added in another station, possibly even interacting with those added in the first, and the data base then built up for the total product, even if only portions of the data are taken in any one place.

There is clearly the ability, since the robots within the cell can be monitored by the same system that looks at the parts and the tools, to consider adding one or more additional parts to the assembly made on the tool. In other words, use of a fixtureless type of development, described amply in the reference application, to essentially add a part if desired to a group of other parts that have been welded together in a tool. This is made possible because all data points that are required are known. As long as the part can be added in a way that doesn't require such a specialized support from the reader, or some other thing that isn't available, this is entirely feasible. This could include the addition of small sheet metal brackets to an otherwise welded up assembly to be done right in that tool.

This is all programmable and one part at one time could have the bracket added in one position, another could have it another, and a third could have something other than a bracket put on. All of this would be possible using one robot to put it down, and a second one to, let us say, force it against the other metal and laser weld it, as was shown in the references 1 and 2.

There is also another aspect of the invention. The photogrammetric systems disclosed in the above references are clearly capable of taking in all the data necessary and processing it after the fact. The same holds true of the newer generation of triangulation or laser radar based 3D "range scanners". Some of these devices have been shown to operate at video rates, creating x, y, z range data within the same credits for hertz. This is an enormous sum to be taking from the parts within the tool, and can be of use, particularly when it is filtered and smoothed, since individual data points have perhaps questionable reliability, but the overall surface can be reliably found. It is envisioned that the system herein would be able to use suitably processed data from such devices, either stored for later processing in order to create the data base, or with particular certain zones processed immediately for instant action.

From a communication point of view, it is also still felt that the communication of the optical image data directly taken from the camera systems is of great use to the operator in diagnosing and understanding what is going on in the cell. In one display he can get information regarding missing holes, missing parts, misloaded parts, data obtained from the dimensions of the parts, or their locations relative to other datums, or positions of robots. All sorts of data can be overlaid on an actual image of the parts in the cell. This is really useful we have found, and indeed he can switch back and forth from one station on a line to another, from sub-assembly to a mating sub-assembly, and get an almost infinitely better understanding of what is going on than is possible today with totally "dumb" "hard" tools.

Disclosed herein is the possibility of performing iterative processes within the tool. For example, today's robot welders simply execute a pre-programmed path which is invariant part to part. However, given the capabilities of the invention, it is possible to do an intelligent welding path. First of all, we can put in the minimum number of spot (or laser) welds that are required in varying locations, and verify that they are correct, at least to the level that we can, from a structural point of view, that is as pointed out elsewhere. Then one can, for example as one of the scenarios, look at the dimensions of the part, having just been tacked down at the key locations, and determine how many further welds within some band of acceptable limits are really required to adjust the part into its correct dimensional conformance at the all key points required, and to make it structurally sound. Use of such as system can reduce the number of welds required on a part, and guarantee that it has correctly been done. This is a major feature, which again, like the reduction of the weld flange widths, creates substantial value for the user. Where laser welds are used, such intelligence is also extremely valuable to define the length and other laser weld requirements, and to make sure that they too have been laid down and the like. All of these, of course, are also verified to be dimensionally in the correct locations relative to the all tooling locator points.

Another form of iterative operation is cutting in the cell. For example, you can use a high powered laser robot as part of the cell to perform certain trimming operations on the flanges, e.g., after welding to reduce the steel, for weight saving, flange interference, aesthetics, or other purposes. Here, once can simply cut to order, making a cut, checking it and, if it's still not quite enough, then cutting again to cut down approaching the level desired. The same holds true with routing of aircraft panels that are held within the tool, or any sort of other machining operation. It even includes metal "addition", such as might be accomplished with ballistic particle guns, arc welds, or other devices used to add material to a part within a tool.

The unique feature of this invention is the ability to construct not only standard tooling sense, which can be adjusted according to the invention, and the parts therein monitored with the invention, but also to build a complete and standard cell for parts within a given volume. This obviates the huge specialized custom development cost of each working cell, and by having common systems of this sort discussed in some of my previous applications, one can drive the cost of the individual cells way down, while increasing the reliability and making ease of maintenance much more clear cut.

The tools described herein, as in the references above, can utilize locating points at multiple areas of the tool, and with simultaneous clamping at those locations, or the clamping requirements to hold metal together, let us say, can be relaxed, and the more programmable systems moveable in x, y, z and even rotation axes as well, used to perform much of this function (e.g., mini-robots).

It is a purpose of this invention, that where possible, to assist in the reduction of the flange width required for spot welding. Some of this width is simply required to get the gun in. However, additional width of metal, perhaps somewhere between 15 and 25%, is composed of "safety factor" metal used to assure that the robot, which does not necessarily repeat perfectly can hit a position within the flange. This is less of a problem with fixed guns, which move up against hard stops. But for maximum flexibility, robot type operations are much desired.

This safety factor metal can be substantially decreased using the invention, which allows one to actually see the welds produced, and correct the robot on, for example the next pass, or to actually see the robot datum point and the part, and correct the instant robot path as well. Much of this has been pointed out in the previous applications, although not specifically to the control of the welds' positional accuracies to the point where the flange width can be reduced. This, of course, means that the part location is known from the system, so that a poorly made part or one which might be somewhat skewed in the cell, can be still welded with certainty.

This has an additional feature, in that it allows not only less metal, but it simples the handling of the part at other locations, and it further allows one some leeway in designing the part, such that these areas become non-critical if one can always correct it with a vision system feedback to the robot controls.

As pointed out above, it is possible to modify the part in the station, since its data base is then known, and its data base after modification can also be determined and used to control the process, and to verify that it has been successfully carried out. This can include reforming the material through laser internal stress generation or other means, even including robot gripping and pulling, if this is acceptable. If can also, however, include a succession of further operations. In the aircraft case this can be the drilling of the rivet holes through the scan and flanges of the wing sections or stabilizer sections, for example. It can include placing of the rivets in the holes, the upsetting of the rivets with the rivet head gun, and also the milling off of the rivet heads, if desired. All of these things can be done with the same robot type system, again very advantageously controlled by the vision system of this invention. Also the holes can be inspected after drilling using a contact optical bore probe, for example, such as shown herein, and within a drilling of a few holes within the system the correct forces and positional variations can be determined and optimized for the remaining holes.

The inter-play of the forces to clamp the material or to weld it, using a clamping action of the spot weld gun for example, is of interest when compared not only to the data base developed given the forces, but also to the machine vision base data. One method of comparison is simply to look for anomalies in the force data, indicative of a misloaded part, or a badly deformed part. This would then be used to signal a maintenance function, or an operator, or maybe as a first line of attack or re-try, where the clamps would be let off, or the gun would be let off, and then reclamped and checked again. Another issue however, is to determine the locations of the parts when these higher forces are determined. This then would allow one to check whether the parts were actually deformed or misplaced.

It should be noted that to see welds, it is desirable to process the part in such a way that the backside of a spot weld is facing the camera. This could involve generally using guns that can operate in such a manner. This allows at least the determination that the weld was indeed put down, and is of some normal size and its location. Here again, this can be monitored over long periods of time, using the system, and the norms established. Unfortunately it is not foolproof. The presence of an indication of the weld does not absolutely guarantee that the weld is satisfactory internally, but at least it gives some comfort, and comes "free" when the vision system is already in place for other reasons. It is also possible to link this data with the current data from the weld arc and other data, such as the tip lifetime in terms of number of spots, and form a reasonable assumption that yes the weld was put down in the right place and correctly. The same vision system can also look at arc welds or laser welds if they are used in the cell, whereas even the contouring can be taken care of, using programmable triangulation devices.

On detection of problems, numerous events can occur, such as shutdown of the line, alerting of the operator that the part is misloaded (if he himself just put it in there, so he can correct it before the machine will cycle), or if the problem is in an automatic line with the clamps that don't come down, parts misloaded, etc. This sort of data can be transmitted directly, including visual images of the problem—a unique feature again, of the vision based system—to the maintenance room.

It is anticipated that tool cells of this type or in combination with other standard size cells, say for door hemming, could be arranged in a row, and loaded by what might be standard press working automation—the cells even looking like presses, or other simple gantry conveyors. This makes a simple type of system, which can be used to batch run a group of parts, and then simply the tool is changed over, together with the automation grippers, just as if it was on a normal transfer press line. It is noted that this standard tool, which use optical sensing to replace many of the wiring and specialized switch protection issues, and the specialized PLC wiring that has to be done in each cell, can save a great deal of money. Plus, it is totally changed over, product changes, without the construction of a second, third or fourth cell, using a huge amounts of floor space and requiring the operators to be trained on the operation of each—a major task.

In addition, because today volumes cannot be predicted exactly, the whole construction of the plant can be completely mismatched to requirements. A car that takes off and sells very well, while making the manufacturer happy, may completely outrun the plant's ability to produce it. Conversely, a car that does not sell as forecast, can result in a plant tooled to make about 2–4 times more cars than required, and essentially suffers enormous losses for the company as a result (one famous case was quoted as $1 billion/year!). Either way, foregone profits or the direct losses are enormous—all of which can be avoided to at least a degree with the invention by simply allowing tools that otherwise are making parts that aren't selling to be converted quickly to those that are, and then back again, if required.

Another interesting feature of the invention is that one can use an interrupted cycle, where in one cycle out of 10, let's say, much more data is taken on the part that is in the tool or station, even if it requires additional cycle time. For example, the scanning laser projector unit shown in FIG. 5 generally has to dwell momentarily at each of the points. It might be able to take a single section within the frame rate of the camera system of 30 hertz by simply moving the spots along a path during the frame integration time, for example, but typically to record a large number of positions one would still require several seconds of additional cycle time. However this, of course, would be well worth it in getting a very good statistical indication of what was being produced.

Because of the invention's potential ability to build aircraft parts, as well as automotive with the same basic standard cell designs, this leads directly to the possibility of "dual use" factories, which can be converted rapidly in war time to aircraft.

As a general comment, an intelligent production system analyzes the parts presented to it, aligns them, if necessary, to its axes, and performs the operations, checking the work thereafter. A rapid optical measurement makes this possible. In addition, this intelligent system learns from the production of parts, the variations within the variables of the incoming parts, and the operation performed, and determines eventually through build up of a data base, either using expert rule based programs or through writing of special programs by trained engineers, the correlation of various conditions of the system itself, such as the locations of the tooling blocks, in this case, the robots etc. and the parts, the correct settings and to reduce the variability of the parts as low as possible.

Another important feature of the invention is that when human operators are used to manually move location details of the various critical locating items and devices within the machine, and even more particularly when they are asked to interchange a locating detail with another one, let us say, for another part; that the optical system can be used to not only guide them in how to do this, but to check the exact location of where they have put the device, and if the individual locating detail is properly coded to actually confirm that it is indeed the right detail.

For example, if an operator was asked to put in three different types of NC blocks with three different part sets, each of the blocks might have not only a single target that was used for the x,y,z location, but one or more additional targets at different locations that would easily discern this block from another. If the computer system driven from the CAD or other programming for the parts in question doesn't confirm that block is in the location and at the right position, the line can't be started. This then nearly foolproofs the system from operator errors, and allows a much less expensive manual system to be used. In the case of infrequent changeovers, the cost of automatic repositioning and interchange of locating surfaces would not be warranted.

Because these processes are typically based on large numbers of parts, it is usually of interest to make no sudden changes in locator position or other parameters (e.g., after a single part reading), but to slowly change some of the operating parameters in order to continually work toward the best fitting solutions for the parts at hand. This includes not just in the tool proper, but in all of the connecting operations. In unusual situations, a large change, such as moving one or more locators by 1 mm or so, can be made to produce a part which otherwise would not be within an acceptable tolerance (typically itself only +/−1.5 mm). In this case, the event is logged in the computer control system together with sensed data as taken on the part, locator positions, robot positions, etc.

FIG. 13

FIG. 13 illustrates a number of electro-optical sensor 900, 901, . . . n, of the invention built for rugged, low cost application within sheet metal welding tools or in the vicinity thereof. The sensors shown use linear diode arrays for accurate, low cost measurement of panel surface location, edge or hole location. Other sensors with matrix arrays may also be used, but generally not with the same processing board using today's technology. The sensors are multiplexed serially by a common triangulation zone centroid and hole or edge finding processor and multiplier board 920 in IBM PC computer 921. While shown here with rapid hardware based processing, part location determination can be either in software or hardware or both. Processing is generally to sub pixel resultions as, for example, disclosed in sensor reference 1, or using simple averaging techniques. Typically a substantial amount of time exists to take the measurements, and the first multiplexor can handle readings from 16 sensors with ease in the time allowed. In addition, time exists to sort through the readings and eliminate any spurious readings which can be due to vibration, or due to EMI (electromagnetic interference) from welding operations, which is often the case. One rule is to reject all part location readings more than 0.2 mm variant from the average of all readings on a particular part, although other rules may also be used to suit the situation.

A matrix array "frame grabber/processor" and multiplexor board 922 is also shown for use with matrix cameras. There are many brands of these, such as those of Matrox in Montreal, Canada.

Point triangulation sensor 900 uses a visible diode laser 930 projected (and usually focused by lens not shown) to a spot shaped zone 929 onto sheet metal surface 931, and imaged at an included angle to the projection direction by lens 932 onto linear array 933 (see also sensor reference 1). Typically, a standoff of 50 mm, with a accuracy of +/−0.1 mm, and a range of +/−5 mm is desirable. This is achieved using an included angle of 15 degrees, a magnification of 0.3, a 256 element linear 256G reticon array having 0.13 $\mu$m inter-element spacing, and by averaging 10 or more data samples, which also serves to average out vibrations of the sensor, if any.

Edge imaging sensor uses 901 uses the same basic sensor arrangement, but with a field illumination source (e.g., one or more LEDs 939 and beam splitter 940) in place of diode laser 930 and, as is often desirable, a multi-beaded retroreflector 940 (e.g., scotchlite) behind, in this case, hole 941 in part 942 is used to direct the on-axis light from light source 939 back the sensor lens 945. For the linear array case used here both edges of the hole are found, and the center determined, finding the hole center in one direction. If the center location in the orthogonal direction is desired, it can be approximated by noting the change in size of the hole, which indicates a shift of the hole away from the original set point (off the true diameter, so changes plus and minus can be so determined). This works to the confidence level depending on how well hole sizes are controlled in their punching operation. However, it is important to note that the prime use of these sensors is to monitor changes from nominal conditions, or average running conditions, and these can be well determined by such techniques, and hole sizes within a given batch of panels are reasonably constant. Indeed detection of holes of grossly improper size (e.g., due to a broken punch) even if it looked like improper location would still be sufficient to signal an operator.

While the present invention has been described with respect to various embodiments thereof, it will be appreciated by those of ordinary skill in the art that variations and modifications are possible within the spirit and scope of the invention.

What is claimed is:

1. A method of joining sheet metal components to form an assembled sheet metal part comprising:

(a) providing assembly tooling comprising a base, a plurality of fixed hard tool locators fixedly mounted on said base, clamping means for holding said sheet metal components in position on said locators for assembly in said tooling, and means for joining said sheet metal components in said position on said locators for assembly to form an assembled sheet metal part in said tooling;

(b) supporting a plurality of sheet metal components on said locators in said position for assembly;

(c) actuating said clamping means to hold said components on said locators in said position for assembly;

(d) actuating said joining means to join said sheet metal components to form said assembled sheet metal part; and (e) electro-optically sensing a plurality of locations of said assembled sheet metal part prior to removing said assembled sheet metal part from said locators.

2. A method according to claim 1 further comprising obtaining data representative of the sensed plurality of locations of said assembled sheet metal part.

3. A method according to claim 2 further comprising comparing the obtained data to a standard.

4. A method according to claim 3 wherein said standard is obtained from an acceptable assembled part produced by said method.

5. A method according to claim 2 further comprising recording the obtained data.

6. A method according to claim 2 comprising obtaining said data for a plurality of assembled parts assembled sequentially over a period of time.

7. A method according to claim 6 further comprising creating a data base from said obtained data.

8. A method according to claim 6 further comprising determining desired locator position data for an assembled part from said data obtained for a plurality of assembled parts over a period of time.

9. A method according to claim 8 further comprising utilizing said data obtained from a plurality of assembled parts to position said locator in said desired position.

10. A method according to claim 2 further comprising adjusting the position of at least one of said locators based on the obtained data.

11. A method according to claim 1 further comprising sensing said clamping means, said joining means, or at least one of said locators.

12. A method according to claim 1 further comprising electro-optically sensing a plurality of locations of at least one of said sheet metal components prior to actuating said joining means.

13. A method according to claim 1 further comprising unclamping said clamping means, and removing said assembled sheet metal part from said tooling.

14. A method according to claim 13 wherein said sensing is effected prior to said unclamping.

15. A method according to claim 13 wherein said sensing is effected after said unclamping.

16. A method according to claim 1 wherein said locations are on a surface of the assembled part.

17. A method according to claim 1 wherein said locations comprise points, lines, or holes.

18. A method according to claim 1 further comprising removing said assembled part from said tooling, determining said plurality of locations of the removed assembled part, and comparing the determined locations with the obtained data representative of the sensed plurality of said locations.

19. A method according to claim 1 further comprising utilizing the obtained data to position said joining means.

20. Assembly tooling for joining sheet metal components to form an assembled sheet metal part comprising:
 a base;
 a plurality of fixed hard tool locators mounted on said base for supporting sheet metal components in fixed positions for assembly;
 clamping means for clamping said components in said fixed position on said locators for assembly in said tooling;
 means for joining said sheet metal components in said fixed positions for assembly to form an assembled sheet metal part in said tooling;
 means for actuating said clamping means to clamp said components in said fixed positions and to unclamp said components;
 means for actuating said joining means to form an assembled sheet metal part in said assembly tooling;
 a plurality of fixed electro-optical sensors fixedly mounted relative to said base and positioned to sense a plurality of locations of an assembled sheet metal part supported on said locators in said assembly tooling; and
 means for reading said sensors.

21. Assembly tooling according to claim 20 wherein said sensor reading means comprises programmable control means programmed to read said sensors to obtain data representative of said locations of said assembled sheet metal part.

22. Assembly tooling according to claim 21 wherein said control means is programmed to read said sensors to obtain said data for a plurality of assembled sheet metal parts assembled sequentially over a period of time, said tooling further comprising means for recording data read from said sensors.

23. Assembly tooling according to claim 21 wherein said control means is programmed to compare the data obtained from at least one of said sensors to a standard.

24. Assembly tooling according to claim 21 wherein said control means is programmed to read said sensors after clamping said clamping means.

25. Assembly tooling according to claim 24 wherein said control means is programmed to read said sensors before unclamping said clamping means.

26. Assembly tooling according to claim 24 wherein said control means is programmed to read said sensors after unclamping said clamping means.

27. Assembly tooling according to claim 21 further comprising means for displaying said data.

28. Assembly tooling according to claim 20 further comprising means for displaying data obtained from said sensors.

29. Assembly tooling according to claim 20 further comprising an electro-optical sensor for sensing said clamping means, said joining means, or at least one of said locators.

30. Assembly tooling according to claim 20 further comprising means for protecting at least one of said sensors from its environment.

31. Assembly tooling according to claim 30 wherein said protecting means comprising a removable and easily replaceable window.

32. Assembly tooling according to claim 20 wherein at least one of said sensors is located within 20 cm of said joining means.

33. Assembly tooling according to claim 32 wherein said joining means comprises a welding gun.

34. Assembly tooling according to claim 20 wherein said sensor comprises a TV camera.

35. Assembly tooling according to claim 20 wherein at least one of said sensors includes means for sensing said location of said assembled part over a range of possible locations.

36. Assembly tooling according to claim 20 wherein at least one of said sensors comprises a laser.

37. Assembly tooling according to claim 20 wherein at least one of said sensors comprises a triangulation sensor.

38. Assembly tooling according to claim 20 wherein at least one of said sensors comprises a detector array.

39. Assembly tooling according to claim 20 wherein at least one of said sensors is positioned to sense a location on a surface of an assembled part facing said base when said assembled part is supported on said locators.

* * * * *